(12) United States Patent
Kou et al.

(10) Patent No.: US 12,446,039 B2
(45) Date of Patent: Oct. 14, 2025

(54) SYSTEMS AND METHODS FOR TRANSMITTING SIGNALS

(71) Applicant: ZTE CORPORATION, Guangdong (CN)

(72) Inventors: Shuaihua Kou, Shenzhen (CN); Peng Hao, Shenzhen (CN); Xing Liu, Shenzhen (CN); Xianghui Han, Shenzhen (CN); Wei Gou, Shenzhen (CN); Yu Ngok Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 377 days.

(21) Appl. No.: 17/671,473

(22) Filed: Feb. 14, 2022

(65) Prior Publication Data

US 2022/0174666 A1    Jun. 2, 2022

Related U.S. Application Data

(63) Continuation of application No. PCT/CN2019/100725, filed on Aug. 15, 2019.

(51) Int. Cl.
*H04W 52/14* (2009.01)
*H04L 1/1812* (2023.01)
*H04L 5/00* (2006.01)
*H04W 72/0446* (2023.01)
*H04W 72/0453* (2023.01)
(Continued)

(52) U.S. Cl.
CPC .......... *H04W 72/21* (2023.01); *H04L 1/1812* (2013.01); *H04L 5/0012* (2013.01); *H04W 72/0446* (2013.01); *H04W 72/0453* (2013.01); *H04W 72/1268* (2013.01)

(58) Field of Classification Search
None
See application file for complete search history.

(56) References Cited

U.S. PATENT DOCUMENTS 10,863,524 B2 *  12/2020  Fakoorian ............. H04L 1/0067
11,212,821 B2 *  12/2021  Jung ................... H04W 72/569
(Continued)

FOREIGN PATENT DOCUMENTS

CN          108112075 A       6/2018
WO     WO-2018/032000 A1     2/2018
(Continued)

OTHER PUBLICATIONS

First Office Action and Search Report for CN App. No. 201980099393.7 dated Dec. 15, 2023 (with English translation, 13 pages).
(Continued)

*Primary Examiner* — Sithu Ko
(74) *Attorney, Agent, or Firm* — Foley & Lardner LLP

(57) ABSTRACT

Systems and methods for wireless communications are disclosed herein. In one embodiment, a wireless communication device that a first transmission on a first resource is canceled. In response to determining that the first transmission on the first resource is canceled, the wireless communication device performs a second transmission of a physical uplink shared channel (PUSCH) on a second resource. Configuration parameters of the second transmission of PUSCH on the second resource are configured by a network side or obtained from the first transmission.

16 Claims, 16 Drawing Sheets

(51) Int. Cl.
*H04W 72/1268* (2023.01)
*H04W 72/21* (2023.01)
*H04W 76/27* (2018.01)

(56) References Cited

U.S. PATENT DOCUMENTS

| | | | |
|---|---|---|---|
| 12,185,356 B2* | 12/2024 | Behravan | H04W 72/566 |
| 2018/0295587 A1 | 10/2018 | Kim et al. | |
| 2019/0052421 A1* | 2/2019 | Yin | H04L 5/0055 |
| 2019/0149269 A1 | 5/2019 | Chatterjee et al. | |
| 2020/0229202 A1* | 7/2020 | Bagheri | H04W 72/23 |
| 2020/0260391 A1* | 8/2020 | Zhou | H04L 1/189 |
| 2020/0344747 A1* | 10/2020 | Park | H04W 72/21 |
| 2020/0383105 A1* | 12/2020 | Park | H04L 1/1896 |
| 2022/0150026 A1* | 5/2022 | Yin | H04L 5/0044 |
| 2022/0217736 A1* | 7/2022 | Taherzadeh Boroujeni | H04L 5/0094 |
| 2023/0345432 A1* | 10/2023 | Deng | H04L 1/1864 |

FOREIGN PATENT DOCUMENTS

| | | |
|---|---|---|
| WO | WO-2018/111948 A1 | 6/2018 |
| WO | WO-2018/142376 A1 | 8/2018 |
| WO | WO-2018/171759 A1 | 9/2018 |
| WO | WO-2019/098059 A1 | 10/2020 |

OTHER PUBLICATIONS

International Search Report and Written Opinion of the International Searching Authority dated Apr. 24, 2020 (7 pages).
CMCC, "Discussion on UL inter UE Tx prioritization/multiplexing" 3GPP TSG RAN WG1 #97, R1-1906520, May 13, 2019, Reno, USA (6 pages).
Extended European Search Report for EP Appl. No. 19941770.0, dated Jun. 29, 2022 (14 pages).
Huawei et al., "UL inter-UE transmission prioritization and multiplexing" 3GPP TSG RAN WG1 Meeting #97, R1-1906061, May 13, 2019, Reno, USA (10 pages).
Zte, "PUSCH enhancements for NR URLLC" 3GPP TSG RAN WG1 #96bis, R1-1904145, Apr. 8, 2019, Xi'an, China (7 pages).

* cited by examiner

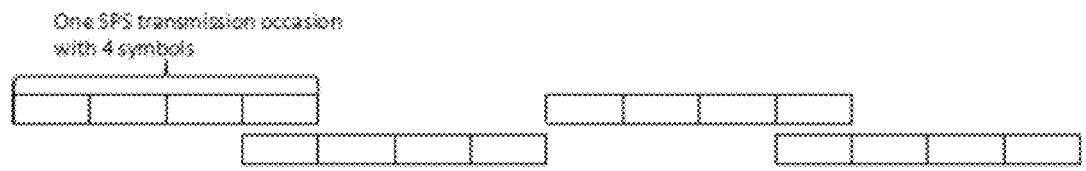
FIG. 10
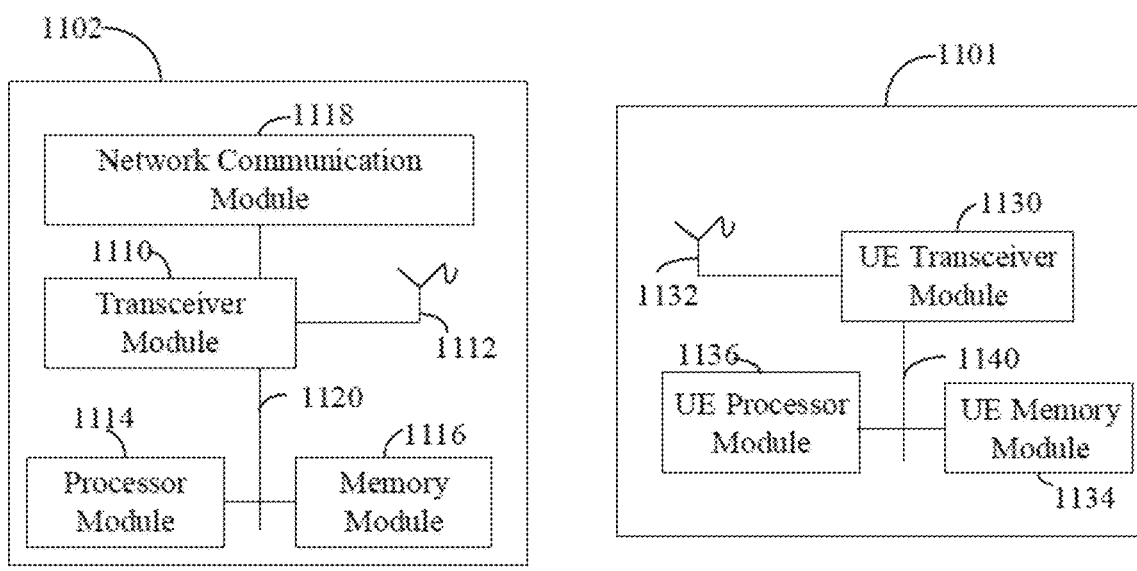
FIG. 11A
FIG. 11B

SYSTEMS AND METHODS FOR TRANSMITTING SIGNALS

CROSS-REFERENCE TO RELATED APPLICATION

This application claims the benefit of priority under 35 U.S.C. § 120 as a continuation of PCT Patent Application No. PCT/CN2019/100725, filed on Aug. 15, 2019, the disclosure of which is incorporated herein by reference in its entirety.

TECHNICAL FIELD

The present disclosure relates to the field of telecommunications, and in particular, to configuring and transmitting a physical uplink shared channel (PUSCH).

BACKGROUND

In ultra-reliable low-latency communication (URLLC) involving intra-user equipment (UE) multiplexing and inter-UE multiplexing, transmission of a UE can be interrupted by high-priority transmission of a service. Such service can be a service of the same UE or a service of one or more other UEs. Given that typically transmission is interrupted for a period of time, the interrupted transmission needs to be retransmitted on uninterrupted resources.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a wireless communication method includes determining, by a wireless communication device, that a first transmission on a first resource is canceled, and in response to determining that the first transmission on the first resource is canceled, performing, by the wireless communication device, a second transmission of a PUSCH on a second resource. Configuration parameters of the second transmission of PUSCH on the second resource are configured by a network side or obtained from the first transmission.

In some embodiments, a wireless communication method includes determining, by a network side, that a first transmission of a wireless communication device on a first resource is canceled, and in response to determining that the first transmission of the wireless communication device on the first resource is canceled, configuring and receiving a second transmission of the wireless communication device for a physical uplink shared channel (PUSCH) on a second resource. The wireless communication device, in response to determining that the first transmission on the first resource is canceled, performs the second transmission of the PUSCH on the second resource. Configuration parameters of the second transmission of PUSCH on the second resource are configured by the network side or obtained from the first transmission.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 10 is a schematic diagram illustrating a semi-persistent scheduling (SPS) transmission occasion, in accordance with some embodiments of the present disclosure.

FIG. 11A illustrates a block diagram of an example base station, in accordance with some embodiments of the present disclosure.

FIG. 11B illustrates a block diagram of an example UE, in accordance with some embodiments of the present disclosure.

DETAILED DESCRIPTION OF EXAMPLE EMBODIMENTS

Figure 1:
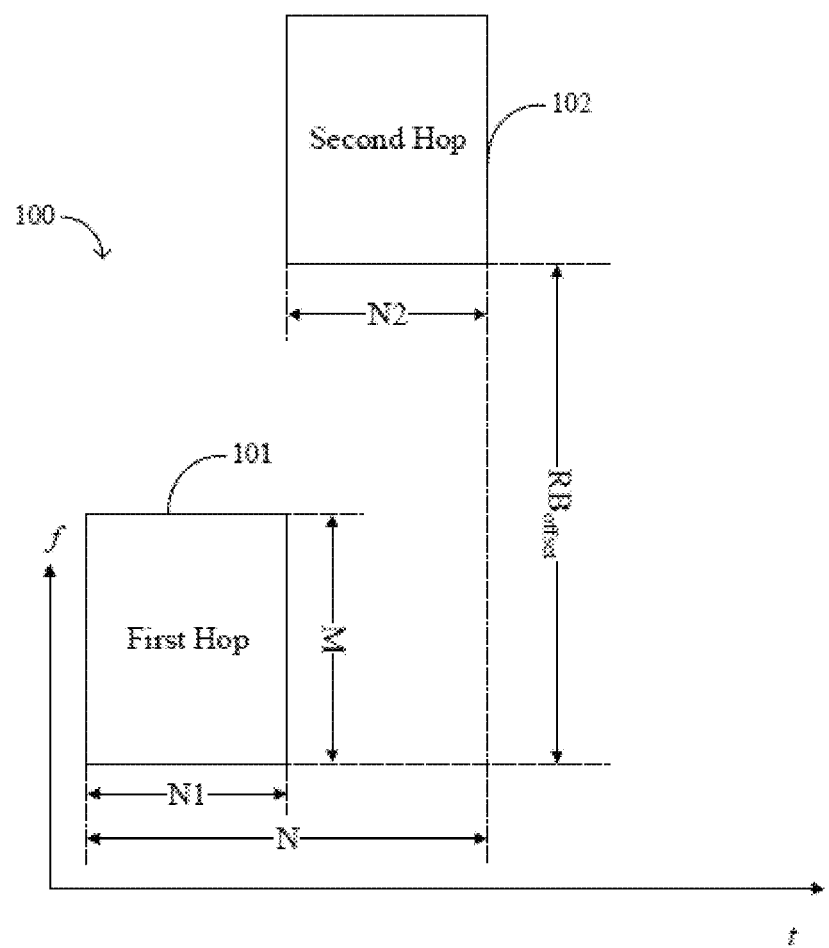
FIG. 1 is a schematic diagram illustrating physical uplink shared channel (PUSCH) resources, in accordance with some embodiments of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Wireless communications support a variety of different services such as but not limited to, URLLC, enhanced mobile broadband (eMBB), massive machine type communications (mMTC), and so on. Different services have different requirements. For example, URLLC services require high reliability and low latency (e.g., user delay being 0.5 ms). A length of transmission resource for URLLC data is typically configured to be short to ensure appropriate time delay for the URLLC data. In addition, a length of transmission resource for eMBB data is typically configured to be long to conserve control signaling overhead, given that eMBB supports high-speed data transmission. In some scenarios, URLLC service may need to be transmitted at any time, even at a time at which another service is scheduled to be transmitted. For instance, transmission of the URLLC service may interrupt the transmission of the eMBB service. The present disclosure relate to the manner in which the transmission of the interrupted eMBB service is transmitted.

A network side of a wireless communication system transmits physical uplink shared channel (PUSCH)-related configuration parameters to a user equipment (UE). Examples of configuration signaling corresponding to the configuration parameters include but are not limited to, physical downlink control channel (PDCCH) signaling, radio resource control (RRC) signaling, and so on. Examples of the configuration parameters include but are not limited to, frequency domain resource configuration parameters, time domain resource configuration parameters, frequency hopping flag, modulation and coding scheme (MCS), new data indication (NDI), redundancy version, hybrid automatic repeat request (HARQ) process number or identification (ID), PUSCH transmission power control command, uplink (UL)/supplementary uplink (SUL) indication, carrier indication, bandwidth part (BWP) indication, downlink (DL) assignment index, sounding reference signal (SRS) resource indication, precoding information and number of layers, antenna port indication, SRS request, channel state information (CSI) request, code block group (CBG) transmission information, phase tracking reference signal (PTRS)-DMRS association information, beta_offset indication, DMRS sequence initialization information, UL-shared channel (SCH) indication, DMRS configuration, repetition number, and so on.

In a wireless communication system, PUSCH frequency hopping can be configured to be disabled or enabled. PUSCH does not perform frequency hopping if the frequency hopping configuration of PUSCH is disabled. PUSCH performs frequency hopping if the frequency hopping configuration of PUSCH is enabled. If frequency hopping configuration of the PUSCH is enabled, time domain resource of the PUSCH can be divided into two parts, referred to herein as a first hop and a second hop. The frequency domain resources of the first and second hops are in different positions. An offset value for the different positions of the frequency domain resource is configured by the network side.

FIG. 1 is a diagram illustrating PUSCH resources 100, according to in accordance with some embodiments of the present disclosure. Referring to FIG. 1, time domain resource (along the t axis) of the PUSCH resources 100 is N OFDM symbols. The frequency domain resource (along the f axis) of the PUSCH resources 100 is M physical resource blocks (PRBs). The PUSCH time domain is divided into two parts. A first part (e.g., a first hop 101) is N1 OFDM symbols. A second part (e.g., a second hop 102) is N2 OFDM symbols. N1 and N2 may or may not be equal, and N1+N2=N. The frequency domain resources of the first hop 101 and the second hop 102 are separated by an offset have a value of $RB_{offset}$ PRBs. In some examples, the network side configures the frequency domain resource position and size of only the first hop 101. The frequency domain resource position of the second hop 102 can be determined from the frequency domain resource position and size of the first hop 101 and the offset value $RB_{offset}$.

Accordingly, FIG. 1 illustrates the scenario in which frequency hopping configuration of the PUSCH is enabled. Whereas frequency hopping configuration of the PUSCH is disabled, the PUSCH resource is not divided and appears as a single block on a frequency versus time diagram.

Figure 2:
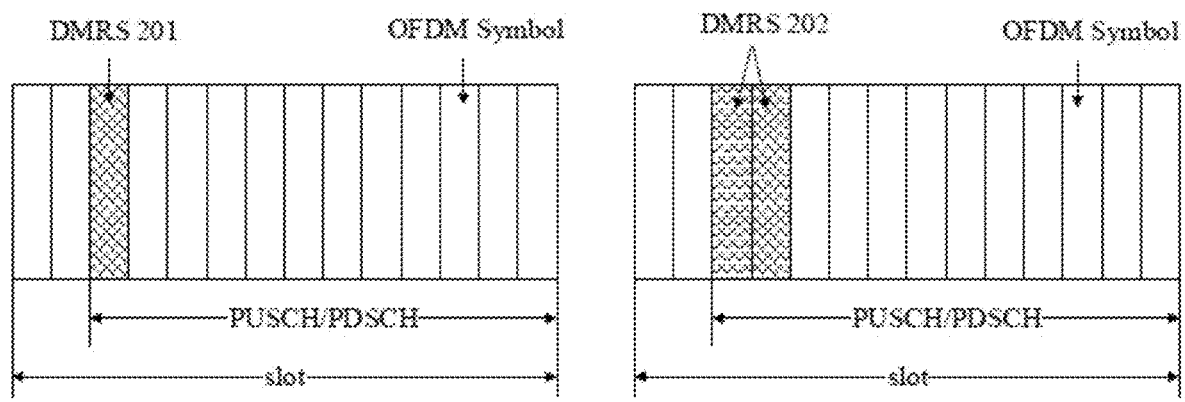
FIG. 2 is a schematic diagram illustrating a front-loaded demodulation reference signal (DMRS) of one symbol and a front-loaded DMRS of two symbols, in accordance with some embodiments of the present disclosure.

The network side of a wireless communication system configures a number of symbols of a front-loaded DMRS via configuration signaling such as but not limited to, DL control information (DCI), RRC signaling, and so on. FIG. 2 is a schematic diagram illustrating a front-loaded DMRS 201 and a front-loaded DMRS 202, in accordance with some embodiments of the present disclosure. Referring to FIGS. 1-2, the front-loaded DMRS 201 has one orthogonal frequency-division multiplexing (OFDM) symbol, which is located at the front of the data resource (e.g., PUSCH/physical downlink shared channel (PDSCH) resource having multiple OFDM symbols). The front-loaded DMRS 202 has two OFDM symbols, which are located at the front of the data resource (e.g., PUSCH/PDSCH resource having multiple OFDM symbols). In addition the front-loaded DMRS 201 and the front-loaded DMRS 202, the data resource/area (e.g., PUSCH/PDSCH) can include other DMRSs. The specific position and number of the other DMRSs can be configured by the network side.

Wireless communication protocol defines UL and DL transmission processing capabilities of a UE. For example, PDSCH processing time and PUSCH preparation time of a UE are defined in 5G New Radio (NR). The PUSCH preparation time is defined as a time interval between the last OFDM symbol of a PDCCH that schedules a PUSCH and the first OFDM symbol of the PUSCH. The PUSCH preparation time corresponds to $N_{PUSCH}$ OFDM symbols. The protocol defines values for $N_{PUSCH}$ in different scenarios such as but not limited to, the sub-carrier spacing (SCS) of the PDCCH or the PUSCH, whether the first OFDM symbol of the PUSCH includes only the DMRS or the DMRS as well as data, and so on.

Figure 3:
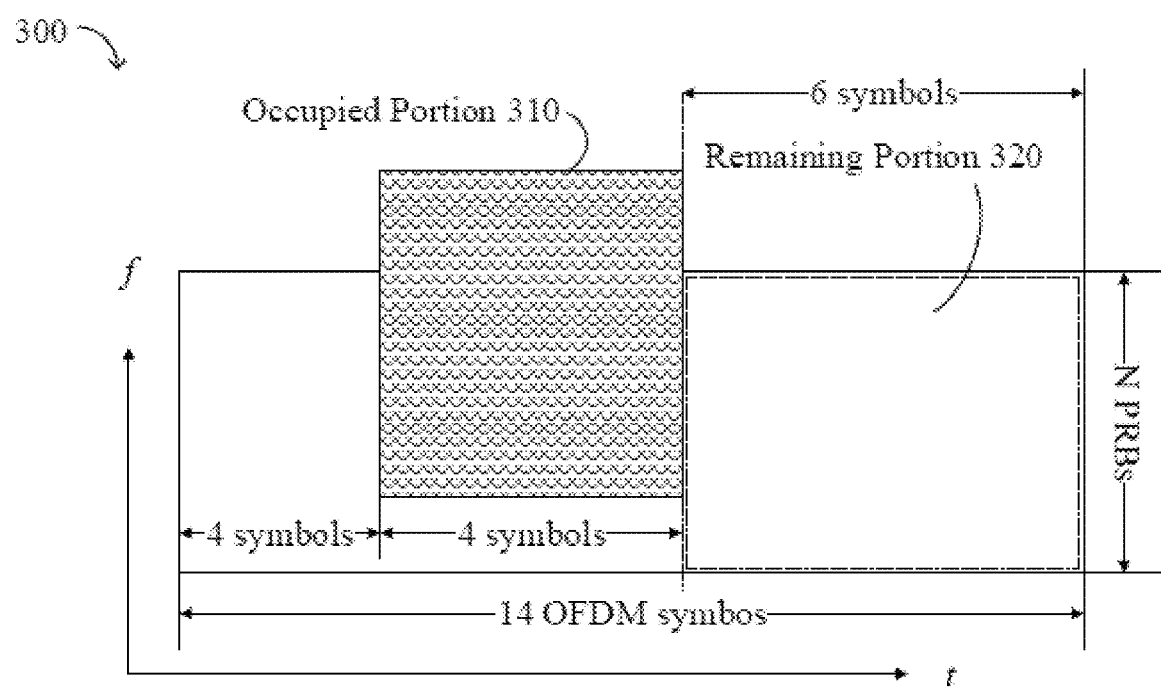
FIG. 3 is a schematic diagram illustrating a resource, in accordance with some embodiments of the present disclosure.

FIG. 3 is a schematic diagram illustrating a resource 300, in accordance with some embodiments of the present disclosure. Referring to FIGS. 1-3, the resource 300 includes a time domain resource (along the t axis) and a frequency domain resource (along the f axis). The resource 300 as shown occupies 14 OFDM symbols in the time domain. The resource 300 occupies N PRB in the frequency domain. A UE to send a first signal (PUSCH) on the resource 300. In other words, a network side configures associated configurations of the resource and the first signal. As shown, a portion (e.g., an occupied portion 310) of the time domain resource of the resource 300 is used to send another signal different from the first signal. In some examples, the another signal is transmitted by the same UE. In other examples, the another signal is a signal transmitted by a different UE. The occupied portion 310 has 4 OFDM symbols in the time domain. In some examples, the occupied portion 310 and the resource 300 do not overlap in the frequency domain. In some examples, the occupied portion 310 and the resource 300 partly overlap in the frequency domain. In other examples, an entirety of the occupied portion 310 overlaps with the resource 300 in the frequency domain. In some embodiments, the UE sends the PUSCH on a remaining portion 320 of the resource 300. In some examples, the configuration of the PUSCH is obtained through the related configuration of the resource 300. In other examples, the configuration of the PUSCH is pre-configured by the network side. The remaining portion 320 has a size of 6 OFDM symbols in the time domain and N PRBs in the frequency domain.

In some embodiments, a UE sends a first signal (first PUSCH) on a first resource configured by a network side. In other words, the network side configures associated configurations of the first resource and the first signal. The first resource includes a time domain resource and a frequency domain resource. A portion of the time domain resource of the first resource overlaps with an overlapped resource. The overlapped resource refers to a resource that is used to send another signal different from the first signal. The same UE can use the overlapped resource to transmit another UL signal (e.g., another PUSCH, physical random access channel (PRACH), SRS, physical uplink control channel (PUCCH), and so on) in some examples. In other examples, another UE different from the UE can use the overlapped resource to transmit information of the another UE. The overlapped resource may or may not overlap in the frequency domain with the first resource. In some embodiments, the UE transmits a second signal (second PUSCH) on an remaining portion of the first resource. The remaining portion of the first resource can be referred to as a second resource. Associated configuration parameters of the second resource and the second PUSCH can be determined, for example, according to FIGS. 4A-4C.

Figure 4A:
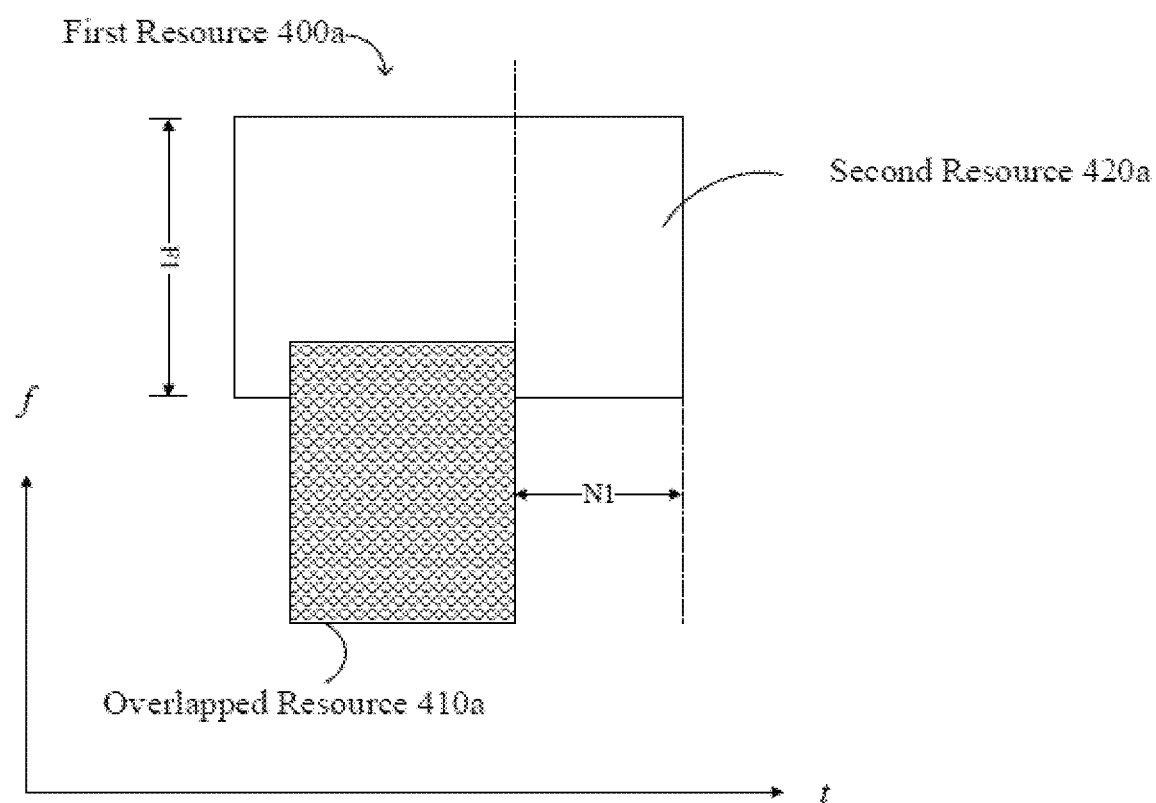
FIG. 4A is a schematic diagram illustrating a first resource and an overlapped resource, in accordance with some embodiments of the present disclosure.

FIG. 4A is a schematic diagram illustrating a first resource 400a and an overlapped resource 410a, in accordance with some embodiments of the present disclosure. Referring to FIGS. 1-4A, FIG. 4A illustrates a scenario in which the frequency hopping configuration of a first PUSCH is disabled. The first PUSCH was originally to be sent on the first resource 400a. A portion of the time domain resource of the first resource 400a overlaps with an overlapped resource 410a in the time domain. The first resource 400a may or may not overlap with the overlapped resource 410a in the frequency domain. A time domain resource of a second resource 420a is a portion of a time domain resource of the first resource 400a that is after the overlapped resource 410a. That is, the time domain resource of the second resource 420a is a time domain resource included in the first resource 400a that is after the overlapped resource 410a. As shown in FIG. 4A, the second resource 420a includes N1 OFDM symbols after the overlapped resource 410a. The second resource 420a can be used to transmit a second PUSCH.

In some embodiments, in response to determining that front-loaded DMRS is transmitted on OFDM symbols of the first resource 400a that are before the overlapped resource 410a, front-loaded DMRS for the second PUSCH does not need to be transmitted on the OFDM symbols located at the front of the second resource 420a. In some examples, data (instead of front-loaded DMRS) is transmitted on the OFDM symbols of the second resource 420a (located at the front of the second resource 420a) that are originally for transmitting the front-loaded DMRS, which is no longer needed as the front-loaded DMRS is transmitted on the OFDM symbols of the first resource 400a that are before the overlapped resource 410a. In some examples, data (instead of front-loaded DMRS) is mapped to the OFDM symbols of the second resource 420a (located at the front of the second resource 420a) that are originally mapped to the front-loaded DMRS. The network side can demodulate the second PUSCH (on the second resource 420a) based on the front-loaded DMRS transmitted on the first resource 400a, before the overlapped resource 410a.

In further embodiments, assuming that a number of front-loaded OFDM symbols is M, in response to determining that N1<M or N1≤M, the second PUSCH is not transmitted. On the other hand, in response to determining that N1>M or N1≥M, the second PUSCH is transmitted on the second resource 420a.

Figure 4B:
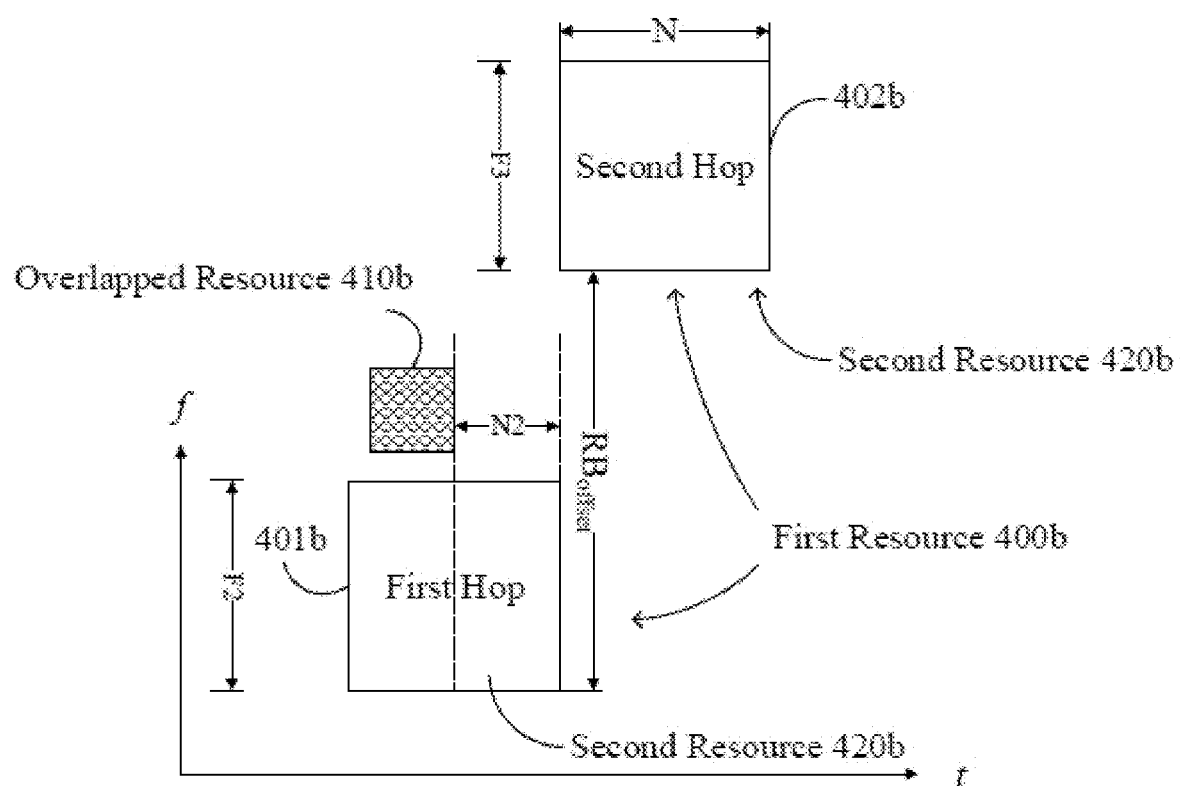
FIG. 4B is a schematic diagram illustrating a first resource and an overlapped resource, in accordance with some embodiments of the present disclosure.

FIG. 4B is a schematic diagram illustrating a first resource 400b and an overlapped resource 410b, in accordance with some embodiments of the present disclosure. Referring to FIGS. 1-4B, FIG. 4B illustrates a scenario in which the frequency hopping configuration of a first PUSCH is enabled, such that the first resource 400b includes a first hop 401b and a second hop 402b. The second hop 402b includes N OFDM signals in the time domain. A number of front-loaded OFDM symbols is M. The first PUSCH was originally to be sent on the first resource 400b. An overlapped resource 410b overlaps with the time domain resource of only the first hop 401b. The overlapped resource 410b may or may not overlap with the first hop 401b in the frequency domain. The first resource 400b has N2+N OFDM symbols after the overlapped resource 410b. As such, a second resource 420b has N2+N OFDM symbols in the time domain. The second resource 420b can be used to transmit a second PUSCH. In some embodiments, in response to determining that front-loaded DMRS is transmitted on OFDM symbols of the first hop 401b that are before the overlapped resource 410b, front-loaded DMRS for the second PUSCH does not need to be transmitted on the OFDM symbols located at the front of the second resource 420b. In some examples, data (instead of front-loaded DMRS) is transmitted on the OFDM symbols of the first hop of the second resource 420b (located at the front of the second resource 420b) that are originally for transmitting the front-loaded DMRS, which is no longer needed as the front-loaded DMRS is transmitted on the OFDM symbols of the first resource 400b that are before the overlapped resource 410b. In some examples, data (instead of front-loaded DMRS) is mapped to the OFDM symbols of the first hop of the second resource 420b (located at the front of the second resource 420b) that are originally mapped to the front-loaded DMRS. The network side can demodulate the second PUSCH (on the second resource 420b) based on the front-loaded DMRS transmitted on the first resource 400b, before the overlapped resource 410b. In some embodiments, in response to determining that N2+N<M or N2+N≤M, the second PUSCH is not transmitted.

In some embodiments, in response to determining that the overlapped resource 410b overlaps with the time domain resource of only the first hop 401b, the time domain resource of the second resource 420b is the time domain resource of the second hop 402b, which has N OFDM symbols. In further embodiments, in response to determining that N<M or N≤M, the second PUSCH is not transmitted.

As shown in FIG. 4B, the overlapped resource 410b overlaps with the time domain resource of only the first hop 401b, and the first hop 401b has N2 OFDM symbols remaining after the overlapped resource 410b. Responsive to determining that a number of OFDM symbols of the first hop 401b that is after the overlapped resource 410b (e.g., N2) is greater than the number of configured front-loaded DMRS symbols (e.g., M), e.g., N2>M or is greater than a value (e.g., M1, where M1 is predefined by the protocol or configured by the network side), e.g., N2>M1, the time domain resource of the second resource 420b is the time domain resource of in the first resource 400b that is after the overlapped resource 410b, which includes the remainder of the first hop 401b and the second hop 402b (e.g., N2+N OFDM symbols). Responsive to determining that a number of OFDM symbols of the first hop 401b that is after the overlapped resource 410b (e.g., N2) is less than or equal to the number of configured front-loaded DMRS symbols (e.g., M), e.g., N2≤M, or is less than or equal to a value (e.g., M1, where M1 is predefined by the protocol or configured by the network side), e.g., N2≤M1, the time domain resource of the second resource 420b is the time domain resource of the second hop 402b, which has N OFDM symbols. For instance, in the case in which N2 is 1 and M is 1 or 2, the second resource 420b is the second hop 402b (e.g., N OFDM symbols). In the case in which N2 is 0 and M is 1 or 2, the second resource 420b is the second hop 402b (e.g., N OFDM symbols). In some embodiments, in response to determining that front-loaded DMRS is transmitted on OFDM symbols of the first hop 401b that are before the overlapped resource 410b, front-loaded DMRS for the second PUSCH does not need to be transmitted on the OFDM symbols located at the front of the second resource 420b. In some examples, data (instead of front-loaded DMRS) is transmitted on the OFDM symbols of the first hop of the second resource 420b (located at the front of the second resource 420b) that are originally for transmitting the front-loaded DMRS, which is no longer needed as the front-loaded DMRS is transmitted on the OFDM symbols of the first resource 400a that are before the overlapped resource 410a. In some examples, data (instead of front-loaded DMRS) is mapped to the OFDM symbols of the first hop of the second resource 420b (located at the front of the second resource 420b) that are originally mapped to the front-loaded DMRS. The network side can demodulate the second PUSCH (on the second resource 420b) based on the front-loaded DMRS transmitted on the first resource 400b, before the overlapped resource 410b. In further embodiments, responsive to determining that N<M or N≤M, the second PUSCH is not transmitted.

Figure 4C:
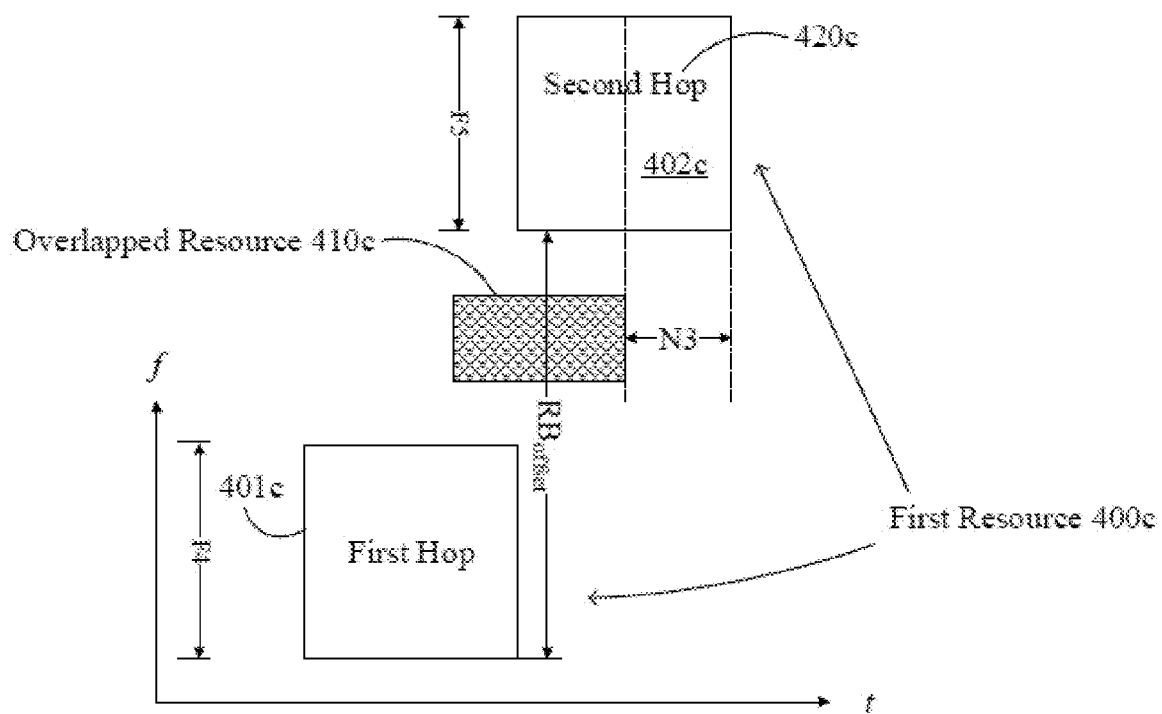
FIG. 4C is a schematic diagram illustrating a first resource and an overlapped resource, in accordance with some embodiments of the present disclosure.

FIG. 4C is a schematic diagram illustrating a first resource 400c and an overlapped resource 410c, in accordance with some embodiments of the present disclosure. Referring to FIGS. 1-4C, FIG. 4C illustrates a scenario in which a frequency hopping configuration of a first PUSCH is enabled, such that the first resource 400c includes a first hop 401c and a second hop 402c. An overlapped resource 410c overlaps with a time domain resource of the second hop 402c. The overlapped resource 410c may or may not overlap with the second hop 402c in the frequency domain. A time domain resource of a second resource 402c is the time domain resource of the first resource 400c (e.g., the second hop 402c) that is after the overlapped resource 410c. As shown, the second resource 402c includes N3 OFDM symbols. The second resource 420c can be used to transmit a second PUSCH. In some embodiments, in response to determining that front-loaded DMRS is transmitted on OFDM symbols of the second hop 402c that are before the overlapped resource 410c, front-loaded DMRS for the second PUSCH does not need to be transmitted on the OFDM symbols located at the front of the second resource 420c. In some examples, data (instead of front-loaded DMRS) is transmitted on the OFDM symbols of the second resource 420c (located at the front of the second resource 420c) that are originally for transmitting the front-loaded DMRS, which is no longer needed as the front-loaded DMRS is transmitted on the OFDM symbols of the second hop 402c that are before the overlapped resource 410c. In some examples, data (instead of front-loaded DMRS) is mapped to the OFDM symbols of the second resource 420c (located at the front of the second resource 420c) that are originally mapped to the front-loaded DMRS. The network side can demodulate the second PUSCH (on the second resource 420c) based on the front-loaded DMRS transmitted on the second hop 402c, before the overlapped resource 410b. In further embodiments, in response to determining that a number of OFDM symbols of the second resource 420c (e.g., N3) is less than or equal to a number of front-loaded DMRS symbols (assumed to be M), e.g., N3<M or N3≤M the second PUSCH is not transmitted.

In some embodiments, frequency domain resource of the second resource used to transmit the second PUSCH is the same as the frequency domain resource of the first resource. In some examples, the frequency domain resources (or resource blocks) being the same refers to the positions of the frequency domain resources being the same and/or the sizes of the frequency domain resources being the same. In some examples, positions of the frequency domain resources being the same refers to the two frequency resource blocks having a same starting PRB or a same central PRB. In the examples in which the frequency hopping configuration of the first PUSCH is disabled, the frequency domain resource of the second resource is the same as the frequency domain resource of the first resource. In the examples in which the frequency hopping configuration of the first PUSCH is enabled, and the time domain of the second resource is located only in the time domain resource of the second hop of the first resource, the frequency domain resource of the second resource is the same as the frequency domain resource of the second hop. In the examples in which the frequency hopping configuration of the first PUSCH is enabled, and the time domain of the second resource includes both the time domain resource of the first hop and the second hop of the first resource, the second resource is separated into two hops, where the frequency resource of each hop of the second resource is the same as a respective one of the first and second hops of the first resource.

Referring to FIG. 4A, the frequency hopping configuration of the first PUSCH is disabled, and the frequency domain resource size of the first resource 400a is F1 PRBs. In this case, the frequency domain resource position of the second resource 420a is the same as the frequency domain resource position of the first resource 400a, and the frequency domain resource size of the second resource 420a is also F1 PRBs.

Referring to FIG. 4B, the frequency hopping configuration of the first PUSCH is enabled, and the first resource 400b is separated into the two hops 401b and 402b. The frequency domain resource size of the first hop 401b is F2 PRBs. The frequency domain resource size of the second hop 402b is F3 PRBs. The overlapped resource 410b overlaps with only the time domain resource of the first hop 401b. The overlapped resource 410b may or may not overlap with the first hop 401b in the frequency domain. In the example in which the time domain resource of the second resource 420b is N OFDM symbols (e.g., the second resource 420b includes only the second hop 402b and not the first hop 401b), the position of the frequency domain resource of the second resource 420b is the same as the frequency domain resource position of the second hop 402b, and the frequency domain resource size of the second resource 420b is F3 PRB. In the example in which the time domain resource of the second resource 420b is N2+N OFDM symbols (e.g., the second resource 420b includes the first hop 401b and the second hop 402b), the second resource 420b includes two hops, and the frequency domain resource position of the first hop of the second resource 420b is the frequency domain resource position of the first hop 401a, and the frequency domain resource size of the first hop of the second resource 420b is F2 PRBs. The frequency domain resource position of the second hop of the second resource 420b is the frequency domain resource position of the second hop 402a, and the frequency domain resource size of the second hop of the second resource 420b is F3 PRBs.

Referring to FIG. 4C, the frequency hopping configuration of the first PUSCH is enabled, and the first resource 400c is separated into the two hops 401c and 402c. The frequency domain resource size of the first hop 401c is F4 PRBs. The frequency domain resource size of the second hop 402c is F5 PRBs. The overlapped resource 410c overlaps with the time domain resource of the second hop 402c. The overlapped resource 410c may or may not overlap with the second hop 402c in the frequency domain. In this example, the frequency domain resource position of the second resource 420c is the same as the frequency domain resource position of the second hop 402c. As such, the frequency domain resource size of the second resource 420c is F5 PRBs.

In some examples in which the frequency hopping configuration of the first PUSCH is disabled, frequency hopping configuration of the second PUSCH is disabled. In some examples in which the frequency hopping configuration of the first PUSCH is enabled, and the time domain resource of the second resource is located in only the second hop of the first resource (and not the first hop of the first resource), the frequency hopping configuration of the second PUSCH is disabled. In some examples in which the frequency hopping configuration of the first PUSCH is enabled, and the time domain resource of the second resource is located in the time domain resources of both the first and second hops of the first resource, the frequency hopping of the second PUSCH is enabled. In some examples in which the time domain resource of a first hop of the second PUSCH corresponds to a portion of the time domain resource of the first hop of the first PUSCH that is after the overlapped resource, a frequency domain resource of the first hop of the second PUSCH is a frequency domain resource of the first hop of the first PUSCH, and the time-frequency domain resource of the second hop of the second PUSCH is the time-frequency domain resource of the second hop of the first PUSCH.

For example, referring to FIG. 4A, the frequency hopping configuration of the first PUSCH is disabled. Accordingly, the frequency hopping configuration for the second PUSCH is also disabled.

For example, referring to FIG. 4B, the frequency hopping configuration of the first PUSCH is enabled, and the first resource 400b is separated into the two hops 401b and 402b. The overlapped resource 410b overlaps with only the time domain resource of the first hop 401b. The overlapped resource 410b may or may not overlap with the first hop 401b in the frequency domain. In some example in which the time domain resource of the second PUSCH (the second resource 420b) is N OFDM symbols, the frequency hopping of the second PUSCH is disabled.

On the other hand, in the example in which the time domain resource of the second resource 420b is N2+N OFDM symbols, the frequency hopping of the second PUSCH enabled. That is, the time domain resource a first hop of the second resource 420b is N2 OFDM symbols. The frequency domain resource position of the first hop of the second PUSCH (e.g., the second resource 420b) is the same as the frequency domain resource position of the first hop of the first PUSCH (e.g., of the first resource 400b). The size of the frequency domain resource of the first hop of the second PUSCH is F2 PRBs. The time domain resource of a second hop of the second PUSCH is N OFDM symbols. The frequency domain resource position of the second hop of the second PUSCH is the same as the frequency domain resource position of the second hop of the first PUSCH. The size of the frequency domain resource of the second PUSCH is F3 PRBs.

Referring to FIG. 4C, the frequency hopping configuration of the first PUSCH is enabled, and the first resource 400c is separated into the two hops 401c and 402c. The overlapped resource 410c overlaps with the time domain resource of the second hop 402c. The overlapped resource 410c may or may not overlap with the second hop 402c in the frequency domain. In this case, the frequency hopping of the second PUSCH is disabled.

In some embodiments, a HARQ process number of second PUSCH is obtained from the first PUSCH. In some embodiments, a HARQ process number of the second PUSCH is the first unoccupied process number immediately after the HARQ process number of the first PUSCH. In the scenario in which the HARQ process numbers between the HARQ process number of the first PUSCH and the largest HARQ process number have been occupied, the next unoccupied HARQ process number after the smallest HARQ process number is used for the second PUSCH. Alternatively, the HARQ process number of the second PUSCH is the first unoccupied HARQ process number immediately before the HARQ process number of the first PUSCH. In the scenario in which the HARQ process numbers between the HARQ process number of the first PUSCH and the smallest HARQ process number have been occupied, the next unoccupied HARQ process number before the largest HARQ process number is used for the second PUSCH. If all HARQ process numbers have been occupied, the second PUSCH is not transmitted.

In one example in which a total of 16 HARQ process numbers are used for sending PUSCH, represented by numbers 0-15, the HARQ process number of the first PUSCH is 3. The occupancy of the HARQ process numbers is determined in an increasing order, starting from the HARQ process number immediately following HARQ process number 3. If the HARQ process number 4 is unoccupied, in one example, the HARQ process number of the second PUSCH is 4. If the HARQ process number 4 is already occupied, the occupancy status of the HARQ process number 5 is determined. If the HARQ process number 5 is unoccupied, the HARQ process number of the second PUSCH is 5. If the HARQ process number 5 is already occupied, then the occupancy status of the HARQ process number after the HARQ process number 5 (e.g., the HARQ process number 6) is determined, and so on. If the HARQ process numbers 4-15 are already occupied, the occupancy status of the HARQ process number 0 is determined. If the HARQ process number 0 is not occupied, the HARQ process number of the second PUSCH is 0. If the HARQ process number 0 is already occupied, the occupancy status of the HARQ process number 1 is determined, and so on.

In another example in which a total of 16 HARQ process numbers are used for sending PUSCH, represented by numbers 0-15, the HARQ process number of the first PUSCH is 9. The occupancy status of the HARQ process numbers is determined in a decreasing order, starting from the HARQ process number immediately before the HARQ process number 9. If the HARQ process number 8 is unoccupied, the HARQ process number of the second PUSCH is 8. If the HARQ process number 8 is already occupied, the occupancy status of the HARQ process number 7 is determined. If the HARQ process number 7 is unoccupied, the HARQ process number of the second PUSCH is 7. If the HARQ process number 7 is already occupied, the occupancy status of the HARQ process number 6 is determined, and so on. If the HARQ process number 0 is already occupied, the occupancy status of the HARQ process number 15 is determined. If the HARQ process number 15 is unoccupied, the HARQ process number of the second PUSCH is 15. If the HARQ process number 15 is already occupied, the occupancy status of the HARQ process number 14 is determined, and so on.

Furthermore, responsive to determining that all 16 HARQ process numbers have been occupied, the second PUSCH is not transmitted.

In some embodiments, the NDI of the second PUSCH is assumed to be 1 or 0. The transmission of the second PUSCH is considered to be a new transmission instead of a retransmission of the first PUSCH. For example, regardless of the value of the NDI, a medium access control (MAC) entity considers that the NDI corresponding to the HARQ process of the second PUSCH has been toggled and delivers the UL grant of the second PUSCH and the associated HARQ information to the HARQ entity. HARQ entity obtains the MAC protocol data unit (PDU) from the multiplexing and assembly entity. MAC generates a new MAC PDU for the second PUSCH. Alternatively, after the MAC receives the configuration information of the second PUSCH, a multiplexing and assembly entity generates a MAC PDU. The HARQ entity obtains the MAC PDU from the multiplexing and assembly entity. The HARQ entity deliver the MAC PDU, the uplink grant of the second PUSCH, HARQ information to the HARQ process. HARQ entity instructs the HARQ process to trigger a new transmission.

In some examples, the MCS of the second PUSCH is the same as the MCS of the first PUSCH. Alternatively, the MCS of the second PUSCH is pre-configured by the network side, for example, via RRC signaling.

In some examples, the redundancy version of the second PUSCH is the same as the redundancy version of the first PUSCH. Alternatively, the redundancy version of the second PUSCH is pre-configured by the network side, for example, via RRC signaling.

In some examples, the transmission power of the second PUSCH is the same as the transmission power of the first PUSCH. Alternatively, the transmission power of the second PUSCH is pre-configured by the network side, for example, via RRC signaling.

In some examples, the SRS resource indication of the second PUSCH is the same as the SRS resource indication of the first PUSCH. Alternatively, the SRS resource indication of the second PUSCH is pre-configured by the network side, for example, via RRC signaling.

In some examples, the precoding information and the number of layers of the second PUSCH are the same as the precoding information and the number of layers of the first PUSCH. Alternatively, the precoding information and the number of layers of the second PUSCH is pre-configured by the network side, for example, via RRC signaling.

In some examples, the antenna port configuration of the second PUSCH is the same as the antenna port configuration of the first PUSCH. Alternatively, the antenna port configuration of the second PUSCH is pre-configured by the network side, for example, via RRC signaling.

In some examples, the DMRS sequence initialization information of the second PUSCH is the same as the DMRS sequence initialization information of the first PUSCH. Alternatively, the DMRS sequence initialization information of the second PUSCH is pre-configured by the network side, for example, via RRC signaling.

In some examples, the other configuration information of the second PUSCH is the same as the corresponding configuration information of the first PUSCH. Alternatively, the other configuration information of the second PUSCH is pre-configured by the network side, for example, via RRC signaling.

In some embodiments, a HARQ process number of second PUSCH is obtained from the first PUSCH. In some embodiments, the HARQ process number of second PUSCH and the HARQ process number of second PUSCH are the same. In one example in which a total of 16 HARQ process numbers are used for sending PUSCH (represented by numbers 0-15) the HARQ process number of the first PUSCH is 3. The HARQ process number of the second PUSCH is also 3.

In some embodiments, the NDI of the second PUSCH is assumed to be 1 or 0. It is considered that the transmission of the second PUSCH is a new transmission. In some examples, MAC service data units (SDUs) and MAC control elements (CEs) carried by the first PUSCH are re-multiplexed and assembled into a MAC PDU, due to size considerations. The MAC PDU is carried by the second PUSCH. Alternatively, after the MAC receives the configuration information of the second PUSCH, the HARQ entity obtains the MAC PDU from the HARQ buffer corresponding to the HARQ process number of the first PUSCH, and the multiplexing and assembly entity multiplexes and assembles the MAC SDU and/or MAC CE obtained from the MAC PDU to form a new MAC PDU. The new MAC PDU is carried on the second PUSCH for transmission. Alternatively, after MAC receives the UL grant for the second PUSCH, HARQ entity indicates to the multiplexing and assembly entity to include, in the second PUSCH, MAC sub-PDUs carrying MAC SDU and/or MAC CE obtained from the MAC PDU in the first PUSCH transmission. HARQ entity obtains the MAC PDU, from the multiplexing and assembly entity.

In some embodiments, a UE transmits a first signal (e.g., a first PUSCH) on the first resource configured by a network side. In other words, the network side configures associated configurations of the first resource and the first signal. In some examples, the network side sends a PDCCH to the UE. The PDCCH indicates that a portion of a time domain resource of the first resource is being used to send another signal different from the first signal. In some examples, the another signal is transmitted by the same UE. In other examples, the another signal is a signal transmitted by a different UE. The another signal is transmitted using an overlapped resource as described herein. The overlapped resource may or may not overlap with the first resource in the frequency domain. The UE transmits a second PUSCH (related to the first PUSCH transmitted on the first resource) on a second resource, which is a portion of the first resource that does not overlap with the overlapped portion (e.g., in the time domain). In some embodiments, the second resource is a portion of the first resource that is located after $N_{PUSCH}$ OFDM symbols after the last symbol of the PDCCH in the time domain. The frequency domain resource of the second resource is the same as the frequency domain resource of the first resource. The other configuration of the PUSCH is obtained by the first resource and the related configuration of the first signal or by the network side. In some examples, the other configurations of the PUSCH is obtained through the related configurations of the first resource and the first signal. In other examples, the other configurations of the PUSCH is pre-configured by the network side.

Figure 5:
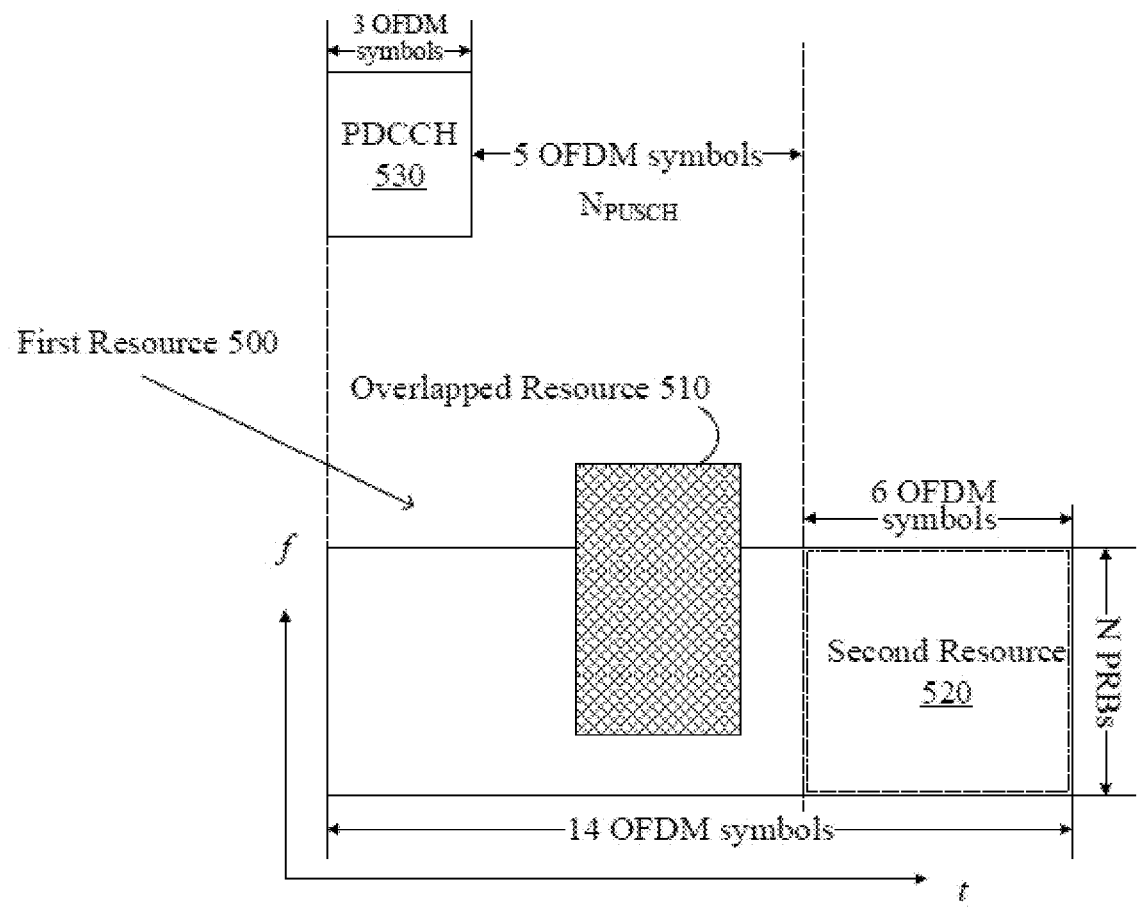
FIG. 5 is a schematic diagram illustrating a first resource and an overlapped resource, in accordance with some embodiments of the present disclosure.

In that regard, FIG. 5 is a schematic diagram illustrating a first resource and an overlapped resource, in accordance with some embodiments of the present disclosure. Referring to FIGS. 1-5, a network side configures a first signal to be sent on a first resource 500 by the UE, for example, via DCI or RRC signaling. As shown, the first resource 500 occupies 14 OFDM symbols in the time domain. The frequency domain resource of the first resource 500 occupies N PRBs. The network side sends a PDCCH 530 to the UE. The PDCCH 530 indicates to the UE that a portion of the 14 OFDM symbols of the first resource 500 is used to transmit other signals different from the first signal. The PUSCH preparation time ($N_{PUSCH}$) of the UE is 5 OFDM symbols. As shown, the first resource 500 has 6 OFDM symbols remaining after 5 OFDM symbols after the last OFDM symbol of the PDCCH 530. As such, the time domain resource of the second resource 520 has the 6 OFDM symbols. The frequency domain resource of the second resource 520 has N PRBs. Other configurations of the PUSCH being sent using the second resource 520 can be derived from the first signal (the first PUSCH) or pre-configured by the network side.

In some embodiments, a UE transmits a first PUSCH on the first resource configured by a network side. The network side sends a PDCCH to the UE. The PDCCH indicates that a portion of a time domain resource of the first resource is being used to send another signal different from the first signal. In some examples, the another signal is transmitted by the same UE. The same UE can use an overlapped resource to transmit another UL signal (e.g., another PUSCH, PRACH, SRS, PUCCH, and so on) in some examples. In other examples, another UE different from the UE can use the overlapped resource to transmit information of the another UE. In some embodiments, the UE transmits a second PUSCH on a remaining portion of the first resource. The remaining portion of the first resource can be referred to as a second resource. Associated configuration parameters of the second resource and the second PUSCH can be determined, for example, according to FIGS. 6A-6C.

In some embodiments, a time domain resource of the second resource is a time domain resource of the first resource that is after $N_{PUSCH}$ OFDM symbols after the last OFDM symbol of the PDCCH, if the frequency hopping configuration of the first PUSCH is disabled. If frequency hopping configuration of the first PUSCH is enabled, a time domain resource of the second resource is a time domain resource of the first resource that is after $N_{PUSCH}$ OFDM symbols after the last OFDM symbol of the PDCCH. In some embodiments, if the frequency hopping configuration of the first PUSCH is enabled, responsive to determining that a number of OFDM symbols in a first hop of the first resource that is after $N_{PUSCH}$ OFDM symbols after the last OFDM symbol of the PDCCH is greater than a number of front-loaded DMRS symbols or is greater than a value, the time domain resource of the second resource is a time domain resource of the first resource that is after $N_{PUSCH}$ OFDM symbols after the last OFDM symbol of the PDCCH. In some embodiments, responsive to determining that a number of OFDM symbols in a first hop of the first resource that is after $N_{PUSCH}$ OFDM symbols after the last OFDM symbol of the PDCCH is less than or equal a number of front-loaded DMRS symbols or is less than or equal to a value, the time domain resource of the second resource is the time domain resource of the second hop of the first resource. In some examples, responsive to determining that a number of OFDM symbols of the second resource is less than or equal to the number of front-loaded DMRS symbols, the second PUSCH is not transmitted.

Figure 6A:
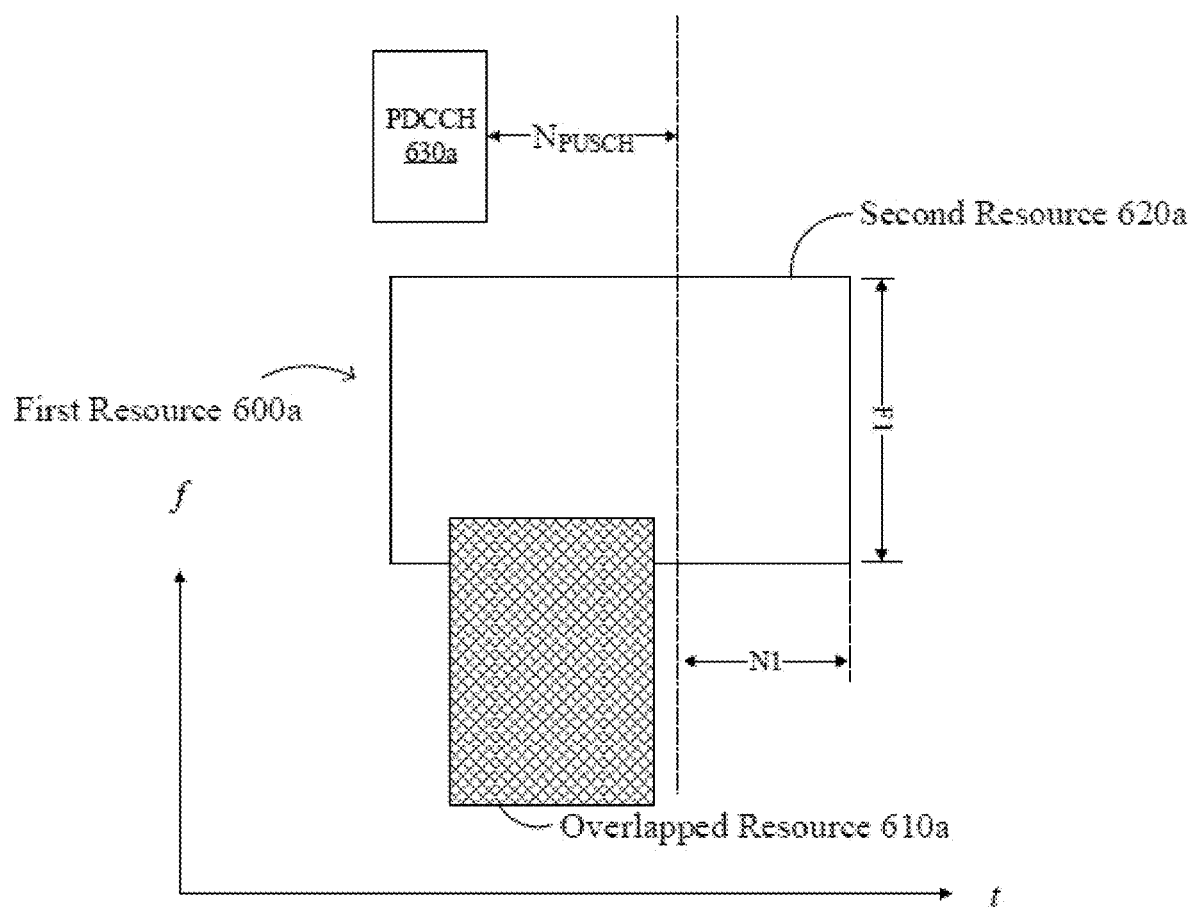
FIG. 6A is a schematic diagram illustrating a first resource and an overlapped resource, in accordance with some embodiments of the present disclosure.

FIG. 6A is a schematic diagram illustrating a first resource 600a and an overlapped resource 610a, in accordance with some embodiments of the present disclosure. Referring to FIGS. 1-6A, as shown in FIG. 6A, the frequency hopping configuration of the first PUSCH is disabled. A first PUSCH is originally to be transmitted on the first resource 600a as configured by a network side. The network side sends a PDCCH 630a to the UE. The PDCCH 630a indicates that an overlapped resource 610a (e.g., a portion of a time domain resource of the first resource 600a) is being used to send another signal different from the first signal. Overlapped resource 610a may or may not overlapped with the first resource 600a in the frequency domain. N1 OFDM symbols remain in the first resource 600a that is after $N_{PUSCH}$ OFDM symbols after the PDCCH 630a. As such, the second resource 620a corresponds to the N1 OFDM symbols of the first resource 600a. In further embodiments in which a number of front-loaded OFDM symbols is M, in response to determining that N1<M, or N1≤M, the second PUSCH is not transmitted. On the other hand, in response to determining that N1>M, or N1≥M, the second PUSCH is transmitted on the second resource 620a.

Figure 6B:
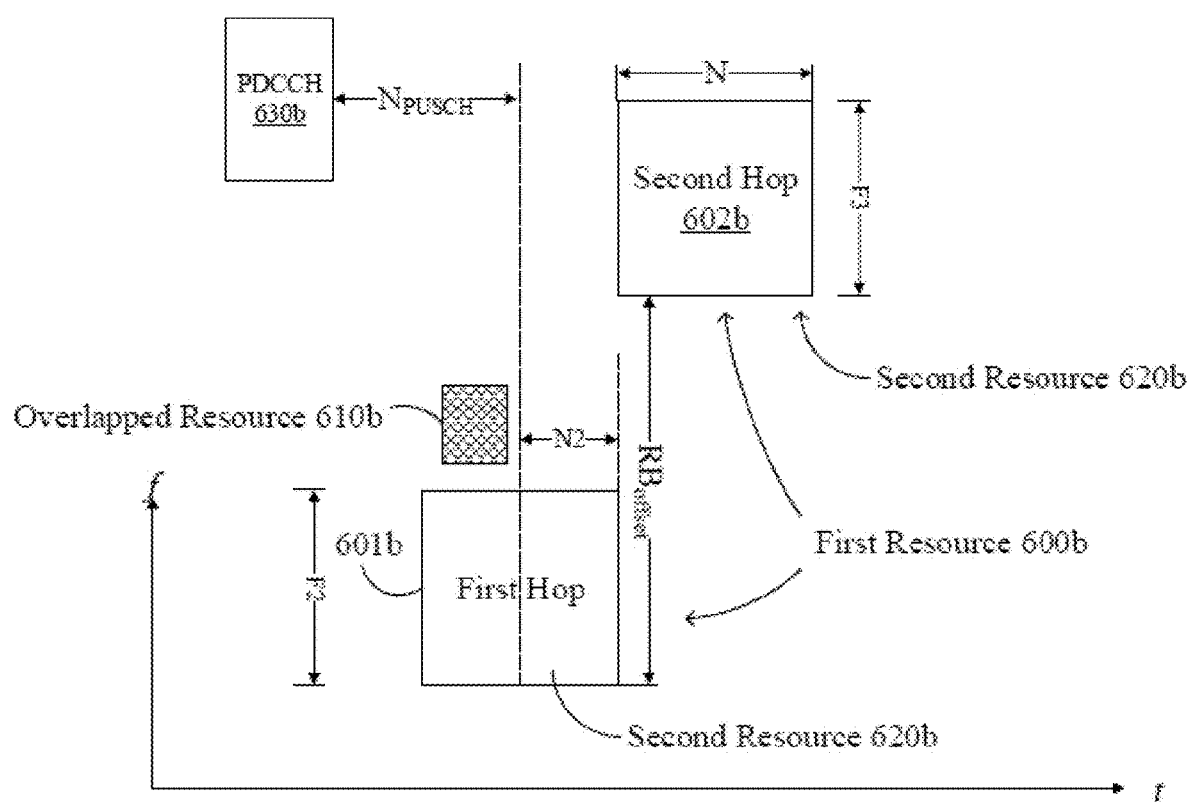
FIG. 6B is a schematic diagram illustrating a first resource and an overlapped resource, in accordance with some embodiments of the present disclosure.

FIG. 6B is a schematic diagram illustrating a first resource 600b and an overlapped resource 610b, in accordance with some embodiments of the present disclosure. Referring to FIGS. 1-6B, FIG. 6B illustrates a scenario in which the frequency hopping configuration of a first PUSCH is enabled, such that the first resource 600b includes a first hop 601b and a second hop 602b. The second hop 602b includes N OFDM signals in the time domain. A number of front-loaded OFDM symbols is M. The first PUSCH was originally to be sent on the first resource 600b. The network side sends a PDCCH 630b to the UE. The PDCCH 630b indicates that the overlapped resource 610b (e.g., a portion of a time domain resource of the first resource 600b) is being used to send another signal different from the first signal. The overlapped resource 610b overlaps with the time domain resource of only the first hop 601b. The overlapped resource 610b may or may not overlap with time the first hop 601b in the frequency domain resource. The first resource 600b has N2+N OFDM symbols that are after $N_{PUSCH}$ OFDM symbols after the PDCCH. As such, the time domain resource of the second resource 620b corresponds to the N2+N OFDM symbols. In some embodiments, in response to determining that (N2+N)<M or (N2+N)≤M, the second PUSCH is not transmitted. The first hop 601b has N2 OFDM symbols that are after $N_{PUSCH}$ OFDM symbols after the PDCCH 630b is such that in response to determining that N2>M or N2>M1, the time domain resource of the second resource 620b is N2+N OFDM symbols. On the other hand, in response to determining that N2≤M or N2≤M1, the time domain resource of the second resource 620b is N OFDM symbols (e.g., the second hop 602b). Further, in response to determining that N<M, or N≤M, the second PUSCH is not transmitted.

Figure 6C:
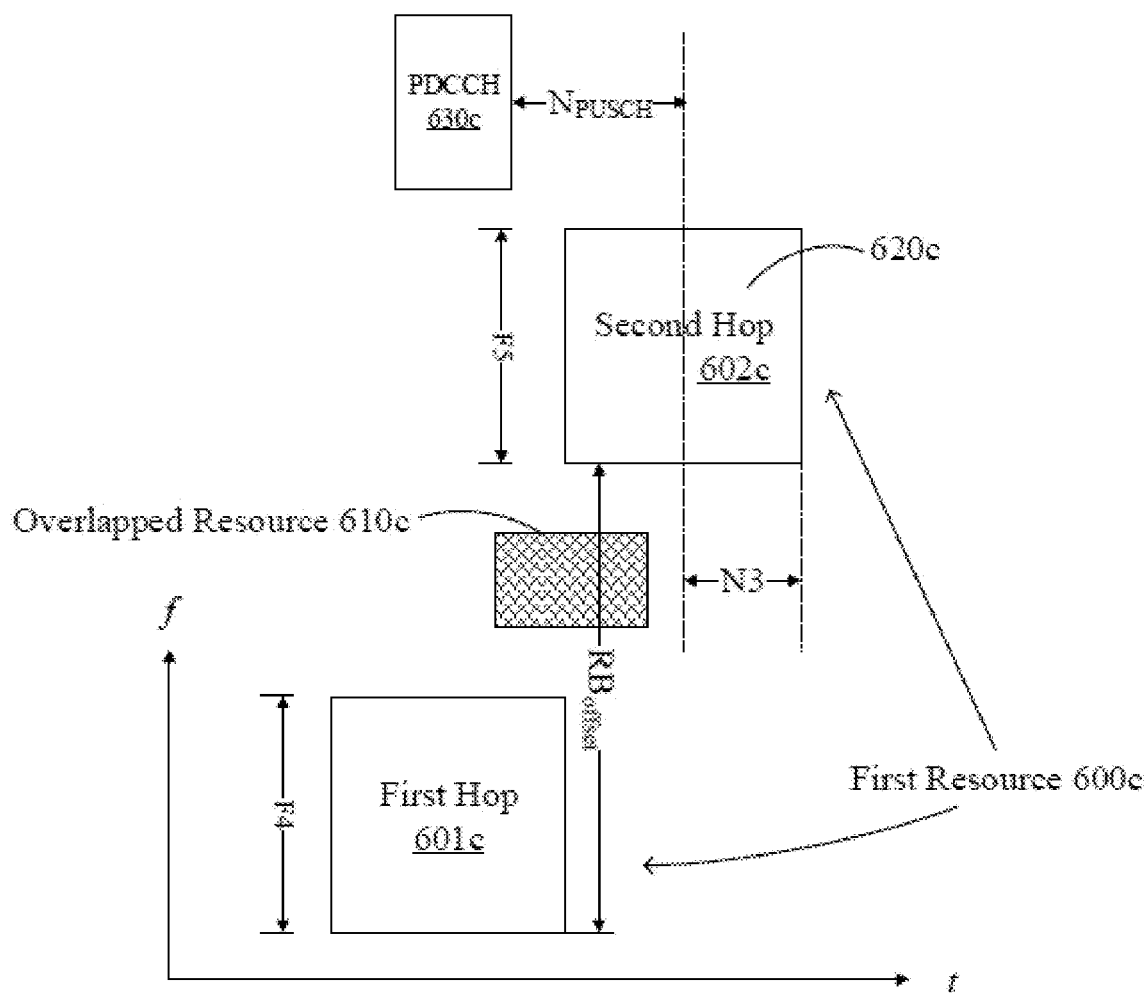
FIG. 6C is a schematic diagram illustrating a first resource and an overlapped resource, in accordance with some embodiments of the present disclosure.

FIG. 6C is a schematic diagram illustrating a first resource 600c and an overlapped resource 610c, in accordance with some embodiments of the present disclosure. Referring to FIGS. 1-6C, FIG. 6C illustrates a scenario in which a frequency hopping configuration of a first PUSCH is enabled, such that the first resource 600c includes a first hop 601c and a second hop 602c. The first PUSCH was originally to be sent on the first resource 600c. The network side sends a PDCCH 630c to the UE. The PDCCH 630c indicates that the overlapped resource 610c (e.g., a portion of a time domain resource of the first resource 600c) is being used to send another signal different from the first signal. The overlapped resource 610c overlaps with a time domain resource of the second hop 602c. The overlapped resource 610c may or may not overlap with the second hop 602c in the frequency domain. The first resource 600c has N3 OFDM symbols that are after $N_{PUSCH}$ OFDM symbols after the PDCCH 630c. As such, the time domain resource of the second resource 620c corresponds to the N3 OFDM symbols. The second resource 620c can be used to transmit a second PUSCH. In response to determining that a number of OFDM symbols of the second resource 620c (e.g., N3) is less than or equal to a number of front-loaded DMRS symbols (assumed to be M), e.g., N3<M or N3≤M the second PUSCH is not transmitted.

In some embodiments, if the pre-defined PUSCH preparation time $N_{PUSCH}$ is an integer, and the time domain resource of the second resource 520, 620a, 620b or 620c is determined by increasing the $N_{PUSCH}$ by 1. On the other hand, if the pre-defined PUSCH preparation time $N_{PUSCH}$ is a non-integer, the value of the $N_{PUSCH}$ is rounded up to the nearest integer. The time domain resource of the second resource 520, 620a, 620b or 620c is determined by the nearest integer.

Referring to FIGS. 6A-6C, in some embodiments, frequency domain resource of the second resource used to transmit the second PUSCH is the same as the frequency domain resource of the first resource. In some examples, the frequency domain resources (or resource blocks) being the same refers to the positions of the frequency domain resources being the same and/or the sizes of the frequency domain resources being the same. In some examples, positions of the frequency domain resources being the same refers to the two frequency resource blocks having a same starting PRB or a same central PRB. In the examples in which the frequency hopping configuration of the first PUSCH is disabled, the frequency domain resource of the second resource is the same as the frequency domain resource of the first resource. In the examples in which the frequency hopping configuration of the first PUSCH is enabled, and the time domain of the second resource is located only in the time domain resource of the second hop of the first resource, the frequency domain resource of the second resource is the same as the frequency domain resource of the second hop. In the examples in which the frequency hopping configuration of the first PUSCH is enabled, and the time domain of the second resource includes both the time domain resource of the first hop and the second hop of the first resource, the second resource is separated into two hops, where the frequency resource of each hop of the second resource is the same as a respective one of the first and second hops of the first resource.

Referring to FIG. 6A, the frequency hopping configuration of the first PUSCH is disabled, and the frequency domain resource size of the first resource 600a is F1 PRBs. In this case, the frequency domain resource position of the second resource 620a is the same as the frequency domain resource position of the first resource 600a, and the frequency domain resource size of the second resource 620a is also F1 PRBs.

Referring to FIG. 6B, the frequency hopping configuration of the first PUSCH is enabled, and the first resource 600b is separated into the two hops 601b and 602b. The frequency domain resource size of the first hop 601b is F2 PRBs. The frequency domain resource size of the second hop 602b is F3 PRBs. In the example in which the time domain resource of the second resource 620b is N OFDM symbols (e.g., the second resource 620b includes only the second hop 602b and not the first hop 601b), the position of the frequency domain resource of the second resource 620b is the same as the frequency domain resource position of the second hop 602b, and the frequency domain resource size of the second resource 620b is F3 PRB. In the example in which the time domain resource of the second resource 620b is N2+N OFDM symbols (e.g., the second resource 620b includes the first hop 601b and the second hop 602b), the second resource 620b includes two hops, and the frequency domain resource position of the first hop of the second resource 620b is the frequency domain resource position of the first hop 601a. The frequency domain resource size of the first hop of the second resource 620b is F2 PRBs. The frequency domain resource position of the second hop of the second resource 620b is the frequency domain resource position of the second hop 602a, and the frequency domain resource size of the second hop of the second resource 620b is F3 PRBs.

Referring to FIG. 6C, the frequency hopping configuration of the first PUSCH is enabled, and the first resource 600c is separated into the two hops 601c and 602c. The frequency domain resource size of the first hop 601c is F4 PRBs. The frequency domain resource size of the second hop 602c is F5 PRBs. In this example, the frequency domain resource position of the second resource 620c is the same as the frequency domain resource position of the second hop 602c. As such, the frequency domain resource size of the second resource 620c is F5 PRBs.

Referring to FIGS. 6A-6C, in some examples in which the frequency hopping configuration of the first PUSCH is disabled, frequency hopping configuration of the second PUSCH is disabled. In some examples in which the frequency hopping configuration of the first PUSCH is enabled, and the time domain resource of the second resource is located in only the second hop of the first resource (and not the first hop of the first resource), the frequency hopping configuration of the second PUSCH is disabled. In some examples in which the frequency hopping configuration of the first PUSCH is enabled, and the time domain resource of the second resource is located in the time domain resources of both the first and second hops of the first resource, the frequency hopping of the second PUSCH is enabled.

In some examples in which the time domain resource of a first hop of the second PUSCH corresponds to a portion of the time domain resource of the first hop of the first PUSCH that is after $N_{PUSCH}$ OFDM symbols after the PDCCH, a frequency domain resource of the first hop of the second PUSCH is a frequency domain resource of the first hop of the first PUSCH, and the time-frequency domain resource of the second hop of the second PUSCH is the time-frequency domain resource of the second hop of the first PUSCH.

For example, referring to FIG. 6A, the frequency hopping configuration of the first PUSCH is disabled. Accordingly, the frequency hopping configuration for the second PUSCH is also disabled.

For example, referring to FIG. 6B, the frequency hopping configuration of the first PUSCH is enabled, and the first resource 600b is separated into the two hops 601b and 602b. In some example in which the time domain resource of the second PUSCH (the second resource 620b) is N OFDM symbols, the frequency hopping of the second PUSCH is disabled. On the other hand, in the example in which the time domain resource of the second resource 620b is N2+N OFDM symbols, the frequency hopping of the second PUSCH enabled. That is, the time domain resource a first hop of the second resource 620b is N2 OFDM symbols. The frequency domain resource position of the first hop of the second PUSCH (e.g., the second resource 620b) is the same as the frequency domain resource position of the first hop of the first PUSCH (e.g., of the first resource 600b). The size of the frequency domain resource of the first hop of the second PUSCH is F2 PRBs. The time domain resource of a second hop of the second PUSCH is N OFDM symbols. The frequency domain resource position of the second hop of the second PUSCH is the same as the frequency domain resource position of the second hop of the first PUSCH. The size of the frequency domain resource of the second PUSCH is F3 PRBs.

Referring to FIG. 6C, the frequency hopping configuration of the first PUSCH is enabled, and the first resource 600c is separated into the two hops 601c and 602c. The time domain resource of the second PUSCH (e.g., the second resource 620c) is N3 OFDM symbols in the second hop of the first PUSCH (e.g., the first resource 600c). In this case, the frequency hopping of the second PUSCH is disabled.

With respect to FIGS. 5-6C, other configuration parameters of or related to the second PUSCH can be determined in the manner described herein, for example, as described with reference to FIGS. 3-4C. Such configuration parameters include but are not limited to, HARQ process number, NDI, MCS, redundancy version, transmission power, SRS resource indication, precoding information, number of layers, antenna port configuration, DMRS sequence initialization information, and other suitable configuration parameters/information.

In some embodiments, a UE transmits a first signal (e.g., a first PUSCH) on the first resource configured by a network side. In other words, the network side configures associated configurations of the first resource and the first signal. In some examples, the network side sends a PDCCH to the UE. The PDCCH indicates that a portion of a time domain resource of the first resource is being used to send another signal different from the first signal. In some examples, the another signal is transmitted by the same UE. In other examples, the another signal is a signal transmitted by a different UE. The another signal is transmitted using an overlapped resource as described herein. The same UE can use an overlapped resource to transmit another UL signal (e.g., another PUSCH, PRACH, SRS, PUCCH, and so on) in some examples. The UE transmits a second PUSCH (related to the first PUSCH) on a second resource, which is a portion of the first resource that does not overlap with the overlapped portion (e.g., in the time domain).

In some embodiments, the time domain resource of the second resource (for the second PUSCH), the frequency domain resource of the second resource, and the frequency hopping configurations for the second PUSCH can be determined in a manner similar to described with respect to FIGS. 5-6C.

In some embodiments, a HARQ process number of the second PUSCH is the same as the HARQ process number of the first PUSCH.

In some embodiments, an NDI of the second PUSCH is assumed to be 1 or 0. The transmission of the second PUSCH is considered to be a new transmission. In some examples, MAC SDUs and MAC CEs carried by the first PUSCH are re-multiplexed and assembled into a MAC PDU, due to size considerations. The MAC PDU is carried by the second PUSCH. Alternatively, after the MAC receives the configuration information of the second PUSCH, the HARQ entity obtains the MAC PDU from the HARQ buffer corresponding to the HARQ process number of the first PUSCH, and the multiplexing and assembly entity multiplexes and assembles the MAC SDU obtained from the MAC PDU to form a new MAC PDU. The new MAC PDU is carried on the second PUSCH for transmission. Alternatively, after MAC receives the UL grant of the second PUSCH, HARQ entity indicates to the multiplexing and assembly entity to include MAC sub-PDUs carrying MAC SDU and/or MAC CE obtained from the MAC PDU in the first PUSCH transmission. HARQ entity obtains the MAC PDU, from multiplexing and assembly entity.

Other configuration parameters of or related to the second PUSCH can be determined in the manner described herein. Such configuration parameters include but are not limited to, MCS, redundancy version, transmission power, SRS resource indication, precoding information, number of layers, antenna port configuration, DMRS sequence initialization information, and other suitable configuration parameters/information.

In a wireless communication system, a minimum interval is needed between two adjacent PUSCH transmissions for some UEs. In some embodiments, start times of two PUSCHs differ by a minimum interval. In one example involving a subcarrier spacing of 15 kH, starting symbols of two adjacent PUSCHs are separated by at least two symbols (e.g., the minimum interval). In another example involving a subcarrier spacing of 30 kHz, starting symbols of two adjacent PUSCHs at separated by at least four symbols.

Figure 7:
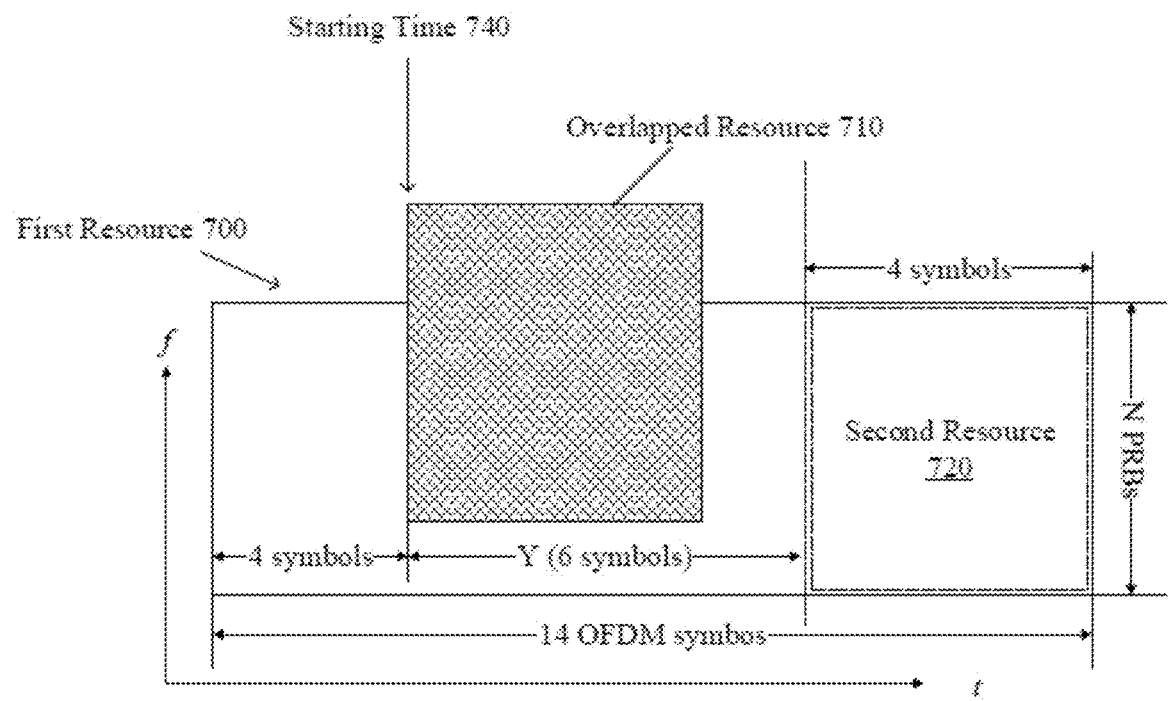
FIG. 7 is a schematic diagram illustrating a first resource and an overlapped resource, in accordance with some embodiments of the present disclosure.

Here, Y OFDM symbols represent the value of a minimum interval between two adjacent PUSCHs. In that regard, FIG. 7 is a schematic diagram illustrating a first resource 700 and an overlapped resource 710, in accordance with some embodiments of the present disclosure. Referring to FIGS. 1-7, as shown in FIG. 7, the frequency hopping configuration of a first PUSCH is disabled. The first PUSCH is originally to be transmitted on the first resource 700 as configured by a network side. The overlapped resource 710 (e.g., a portion of a time domain resource of the first resource 700) is being used to send another signal different from the first signal. A second resource 720 is a portion of the first resource 700 that begins from Y OFDM symbols (e.g., 6 OFDM symbols) after the start time of the overlapped resource 710. In some embodiments, Y is a value predefined by the protocol or configured by the network side.

As referred to herein, the starting time of a resource is the time at which the first OFDM symbol of the resource begins to be transmitted. In other words, a starting time 740 of the overlapped resource 710 is the time at which the first OFDM symbol of the overlapped resource 710 begins to be transmitted.

In some embodiments (e.g., those described with reference to FIGS. 8A-8C), the starting symbol of the second resource is a symbol after a number of OFDM symbols (denoted as "Y") from a reference time, which can be the starting time of the overlapped resource.

Figure 8A:
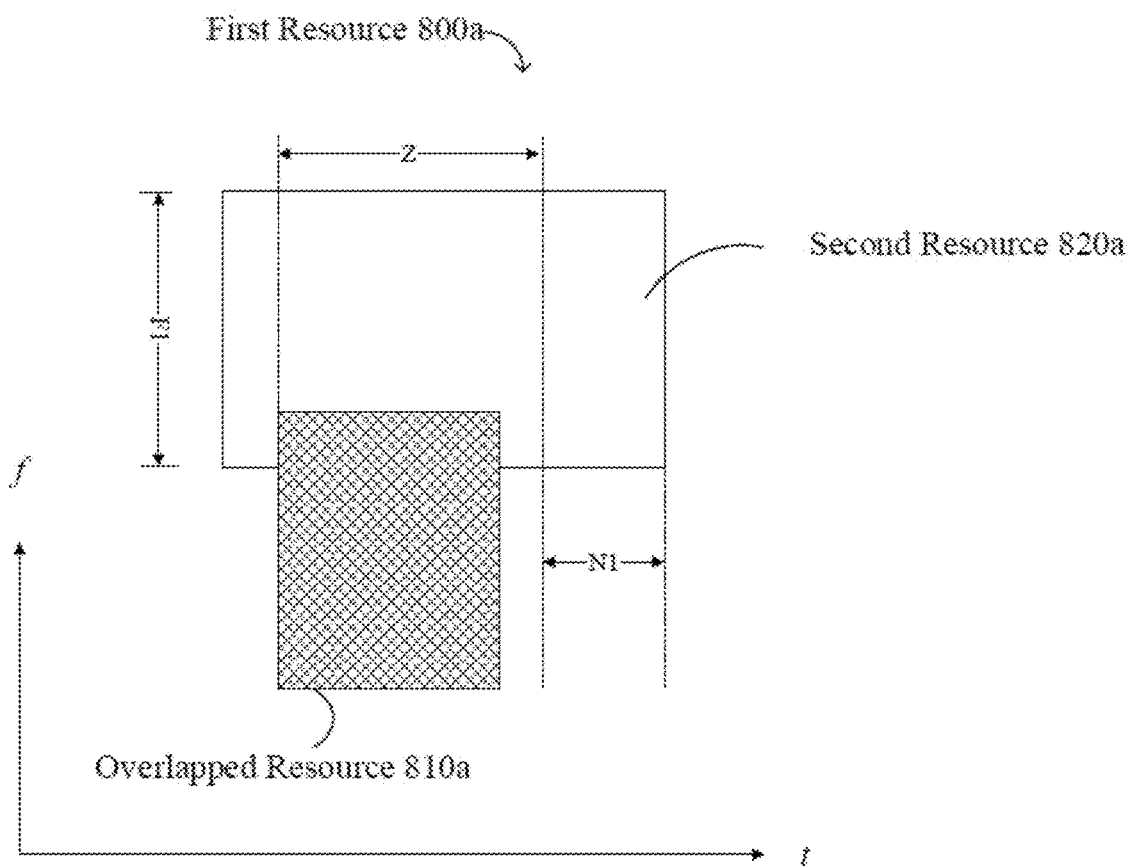
FIG. 8A is a schematic diagram illustrating a first resource and an overlapped resource, in accordance with some embodiments of the present disclosure.

FIG. 8A is a schematic diagram illustrating a first resource 800a and an overlapped resource 810a, in accordance with some embodiments of the present disclosure. Referring to FIGS. 1-8A, FIG. 8A illustrates a scenario in which the frequency hopping configuration of a first PUSCH is disabled. The first PUSCH was originally to be sent on the first resource 800a. A portion of the time domain resource of the first resource 800a overlaps with the overlapped resource 810a. The first resource 800a may or may not overlap with resource 810a in the frequency domain. A time domain resource of a second resource 420a is a portion of a time domain resource of the first resource 800a that is after Z symbols after the starting time of the overlapped resource 810a. As shown in FIG. 8A, the second resource 820a includes N1 OFDM symbols. The second resource 820a can be used to transmit a second PUSCH.

Figure 8B:
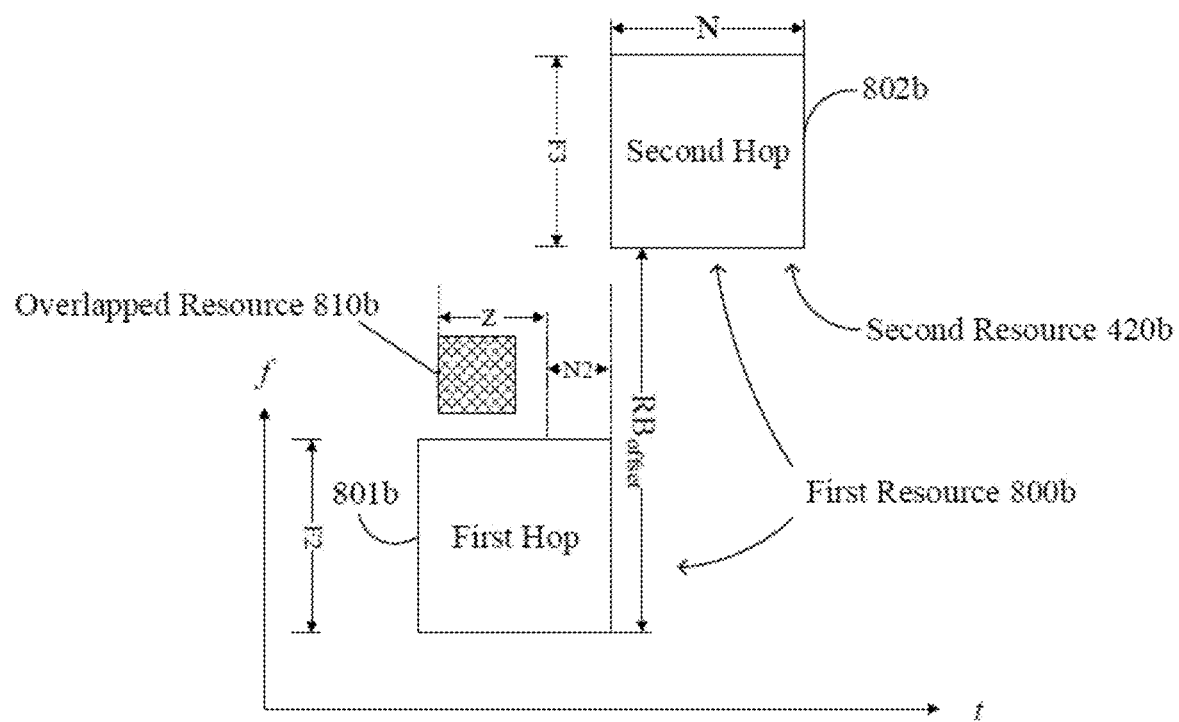
FIG. 8B is a schematic diagram illustrating a first resource and an overlapped resource, in accordance with some embodiments of the present disclosure.

FIG. 8B is a schematic diagram illustrating a first resource 800b and an overlapped resource 810b, in accordance with some embodiments of the present disclosure. Referring to FIGS. 1-8B, FIG. 8B illustrates a scenario in which the frequency hopping configuration of a first PUSCH is enabled, such that the first resource 800b includes a first hop 801b and a second hop 802b. The second hop 802b includes N OFDM signals in the time domain. The first PUSCH was originally to be sent on the first resource 800b. An overlapped resource 810b overlaps with the time domain resource of only the first hop 801b. Overlapped resource 810b may or may not overlap with the first hop 801b in the frequency domain. In some embodiments, a time domain resource of a second resource 820b is a portion of a time domain resource of the first resource 800b that is after Z symbols after the starting time of the overlapped resource 810a. As shown, the second resource 820b includes N2+N OFDM symbols. The second resource 820b can be used to transmit a second PUSCH. In some embodiments, a time domain of resource of a second resource 820b is the time domain of resource of the second hop 802b. As shown, the second resource 820b includes N OFDM symbols. In some embodiments, responsive to determining that a number of OFDM symbols of the first hop 801b that is after the Z symbols after the starting time of the overlapped resource 810b (e.g., N2) is greater than the number of configured front-loaded DMRS symbols (e.g., M), e.g. N2>M or is greater than a number, e.g., N2>M1, a time domain resource of a second resource 820b is a portion of a time domain resource of the first resource 800b that is after Z symbols after the starting time of the overlapped resource 810b. As shown, the second resource 820b includes N2+N OFDM symbols. In some embodiments, responsive to determining that a number of OFDM symbols of the first hop 801b that is after the Z symbols after the starting time of the overlapped resource 810b (e.g., N2) is less than or equal to the number of configured front-loaded DMRS symbols (e.g., M), e.g. N2≤M or is less than or equal to a number, e.g., N2≤M1, a time domain of resource of a second resource 820b is the time domain of resource of the second hop 802b. As shown, the second resource 820b includes N OFDM symbols.

Figure 8C:
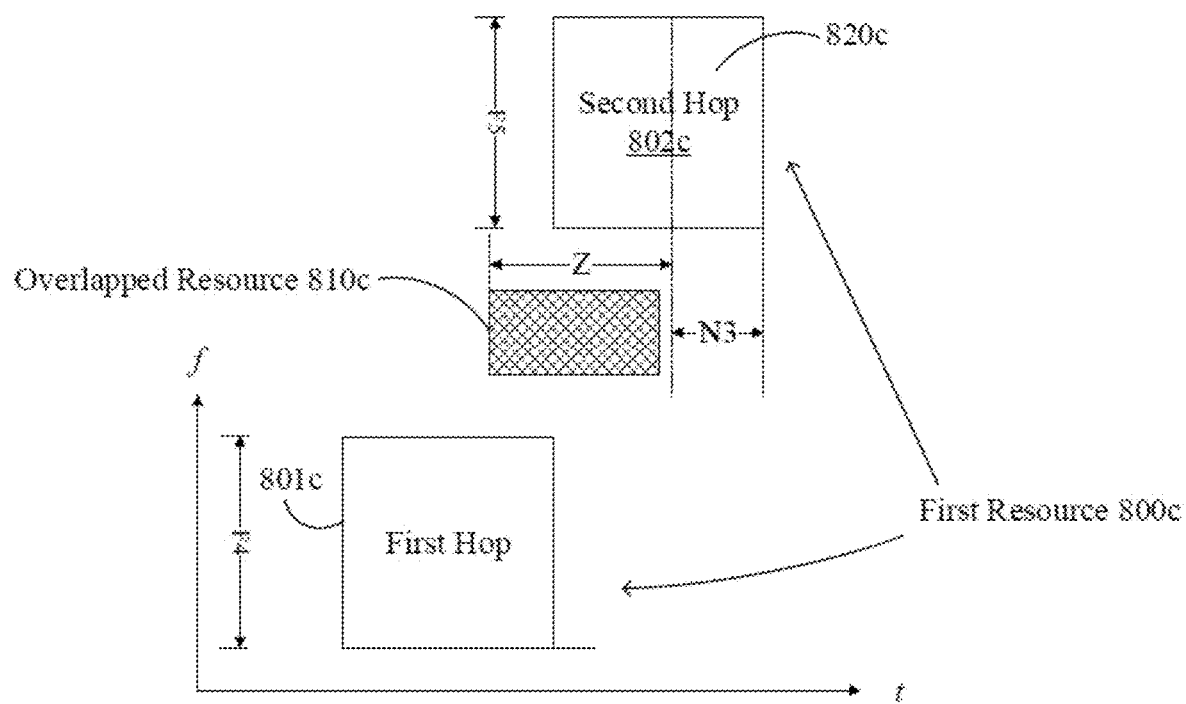
FIG. 8C is a schematic diagram illustrating a first resource and an overlapped resource, in accordance with some embodiments of the present disclosure.

FIG. 8C is a schematic diagram illustrating a first resource 800c and an overlapped resource 810c, in accordance with some embodiments of the present disclosure. Referring to FIGS. 1-8C, FIG. 8C illustrates a scenario in which a frequency hopping configuration of a first PUSCH is enabled, such that the first resource 800c includes a first hop 801c and a second hop 802c. An overlapped resource 810c overlaps with a time domain resource of the second hop 802c. An overlapped resource 810c may or may not overlap with the second hop 802c in the frequency domain. A time domain resource of a second resource 802c is the time domain resource of the first resource 800c (e.g., the second hop 802c) that is after Z symbols after the starting time of the overlapped resource 810c. As shown, the second resource 820c includes N3 OFDM symbols. The second resource 820c can be used to transmit a second PUSCH.

In some embodiments, time domain resources of the second resource are determined using the different methods described herein. In response to determining that the time domain resources of the second resource (determined using the different methods) are different, in some examples, the smallest time domain resource of the second resource (i.e., the time domain resource of the second resource having the smallest number of OFDM symbols) is selected and used. In response to determining that the time domain resources of the second resource (determined using the different methods) are different, in some examples, the time domain resource of the second resource having the latest start time (i.e., the time domain resource of the second resource having the largest OFDM symbol number) is selected and used.

To accommodate some deterministic or periodic traffic (e.g., time sensitive network (TSN) traffic), the network can configure semi-persistent scheduling (SPS) for PDSCH transmission, while also saving DL control overhead. In some examples, the SPS periodicity is determined based on a periodicity of the traffic. In NR Release 15, the minimum periodicity of DL SPS is 10 ms. Only one SPS configuration is supported. However, there can be multiple services with different requirements in the network. Different SPS configurations can be supported to accommodate different services. In some embodiments, one SPS configuration with one set of parameters including the periodicity is configured for one service. Moreover, current periodicity with a minimum of 10 ms is too big to meet the low-latency requirement of services like URLLC. Thus, shorter periodicities (e.g., shorter than 10 ms) are needed.

On the other hand, when shorter periodicities and multiple SPS configurations are introduced, the present current mechanism may not be feasible HARQ-ACK codebook determination, HARQ-ACK timing indication, PUCCH resource determination, and so on.

Some embodiments described herein relate to determining HARQ-ACK timing K1.

In current specification, the HARQ-ACK timing for SPS PDSCH is defined as follows. For a SPS PDSCH reception ending in slot n, the UE transmits the PUCCH in slot n+k where k is provided by the PDSCH-to-HARQ-timing-indicator field in DCI format 1_0 or, if present, in DCI format 1_1 activating the SPS PDSCH reception. In response to the UE detecting a DCI format 1_1 that does not include a PDSCH-to-HARQ-timing-indicator field, and the DCI format 1_1 schedules a PDSCH reception or activates a SPS PDSCH reception ending in slot n, the UE provides corresponding HARQ-ACK information in a PUCCH transmission within slot n+k where k is provided by dl-DataToUL-ACK.

Based on the specification mentioned above, if slot n+k is not a UL slot, the UE will not transmit HARQ-ACK. This is not an issue when the SPS periodicity is no less than 10 ms. Because the network can always make sure the slot n+k is an UL slot by implementation. However, there can be multiple cases in which it will be very difficult or even impossible to guarantee that the slot n+k is an UL slot. A first case relate to the SPS periodicity being 1 slot in time division duplex (TDD) configuration. A second case relate to the SPS periodicity being less than 1 slot in TDD/frequency division duplex (FDD) configuration. A third case relate to the SPS periodicity being 1 slot with UL sub-carrier spacing (SCS) smaller than DL SCS in TDD/FDD configuration. A fourth case relate to the SPS periodicity of 1 or even larger than 1 slot, in TDD/FDD configuration, with multiple SPS configurations. Considering the first case for example, a TDD configuration with a periodicity of "DDDDU," where "D" means a DL slot and "U" is an UL slot, the HARQ-ACK associated for SPS PDSCH for all DL slots can only be in one UL slots. That means a configuration of one k value is no longer feasible. The HARQ-ACK of multiple SPS PDSCHs for other cases can be in the same UL slots, such that a configuration of one k value is no longer feasible.

In some embodiments, a wireless communications method is described herein to include receiving, at a wireless device from a network node, a first indication of a set of HARQ-ACK timing values. The method further includes receiving, at a wireless device from a network node, a second indication of a set of PUCCH resources. The method further includes determining, a transmission occasion based on the set of HARQ-ACK timing values. The method further includes determining, a transmission resource in a slot based on the set of PUCCH resources. The method further includes transmitting, by the wireless device, HARQ-ACK information for semi-persistent scheduling transmission.

In some embodiments, the first indication is configured by RRC or by an activation DCI. In some embodiments, the first indication is indicated by an activation DCI which selects one set of HARQ-ACK timing values from a super set of values configured by RRC.

In some embodiments, independent HARQ-ACK timing value(s) for each DL slot in one period is indicated. In some embodiments, the same HARQ-ACK timing value is used for SPS PDSCHs within a slot. In some embodiments, the period is the same as the period of the slot configuration.

In some embodiments, independent HARQ-ACK timing value(s) for each SPS PDSCH within a slot is indicated. In some embodiments, the same HARQ-ACK timing values are used for SPS PDSCHs across different slots.

In some embodiments, independent HARQ-ACK timing value(s) for each SPS PDSCHs in one period is indicate. In some embodiments, the period is the same as the period of the slot configuration.

In some embodiments, one or more SPS PDSCH groups are defined, and independent HARQ-ACK timing value(s) for each SPS PDSCH group is indicated. In some embodiments, the same HARQ-ACK timing value is used within a SPS PDSCH group. In some embodiments, the SPS PDSCH groups are defined in one period. In some embodiments, the period is the same as the period of the slot configuration. In some embodiments, the SPS PDSCH occasion within one group are consecutive.

Figure 9A:
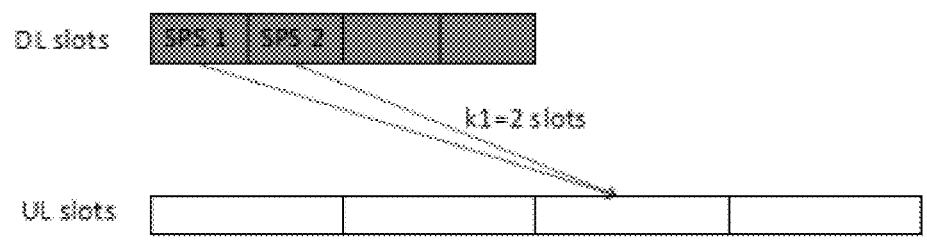
FIG. 9A is a schematic diagram illustrating a k1 value for downlink and uplink slots, in accordance with some embodiments of the present disclosure.

Some embodiments described herein relate to determining the PUCCH resource for SPS PDSCH. In case of a SPS periodicity of 1 slot with UL SCS smaller than DL SCS in TDD/FDD configuration, the HARQ-ACK associated with different SPS PDSCHs can be in one UL slot based on the HARQ-ACK timing value indication. An example is shown in FIG. 9A, where HARQ-ACK timing value k1 is 2 slots.

Figure 9B:
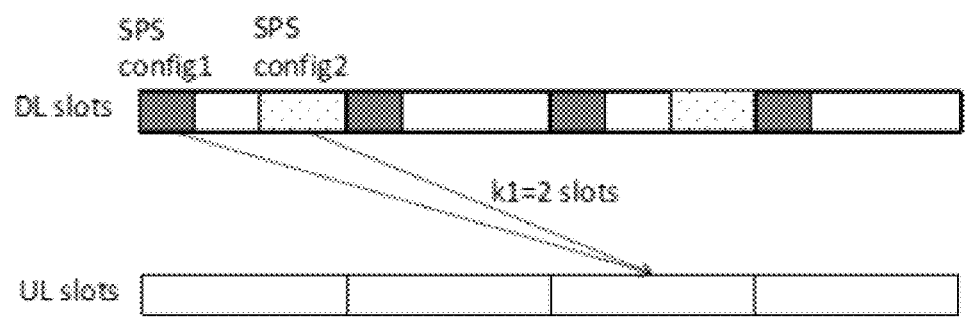
FIG. 9B is a schematic diagram illustrating a k1 value for downlink and uplink slots, in accordance with some embodiments of the present disclosure.

In case of a SPS periodicity of 1 or greater than 1 slot, and with multiple SPS configurations in TDD/FDD configuration, the HARQ-ACK associated with different SPS PDSCHs can be in one UL slot based on the HARQ-ACK timing value indication. An example is shown in FIG. 9B, where the periodicity of the first SPS configuration is one slot, and the periodicity of the second SPS configuration is one slot. HARQ-ACK timing value k1 is 2 slots.

In some examples, more than one HARQ-ACK bits needs to be carried in one SPS PUCCH resource. However, the current PUCCH resource for SPS PDSCH HARQ-ACK feedback is one for one HARQ-ACK bits.

In some embodiments, a wireless communications method includes receiving, at a wireless device from a network node, a first indication of a set of HARQ-ACK timing values. The wireless communications method further includes receiving, at a wireless device from a network node, a second indication of a set of PUCCH resources. The wireless communications method further includes determining, a transmission occasion based on the set of HARQ-ACK timing values. The wireless communications method further includes determining, a transmission resource in a slot based on the set of PUCCH resources. The wireless communications method further includes transmitting, by the wireless device, HARQ-ACK information for semi-persistent scheduling transmission.

In some embodiments, the second indication is configured by RRC or by an activation DCI. In some embodiments, the second indication is indicated by an activation DCI which selects one set of PUCCH resources from a super set of values configured by RRC. In some embodiments, the second indication includes a predefined rule for PUCCH resource selection.

In some embodiments, at least two PUCCH resource sets are configured. One resource set is for PUCCH resource for up to 2 bits. One resource set is for PUCCH for more than 2 bits. In some embodiments, the UE selects one PUCCH resource set based on the payload to. In some embodiments, the PUCCH resource for transmission from the selected PUCCH resource set is determined by an indicator in activation DCI. In some embodiments, the PUCCH resource for transmission from the selected PUCCH resource set is determined by a predefined rule for SPS PDSCH without DCI. In some embodiments, the predefined rule includes at least one of: choosing the first PUCCH resource in the PUCCH resource set for transmission, choosing the last PUCCH resource in the PUCCH resource set for transmission, and choose the first PUCCH resource which satisfies the indicated coding rate requirement, where the resources are indexed according to an ascending order for the product of a number of corresponding REs, modulation order $Q_m$, and configured code rate r. If the last PUCCH resource fails to satisfy the coding rate requirement, the last PUCCH resource in the PUCCH resource set is chosen.

In some embodiments, at least two PUCCH resources are configured. One PUCCH resource is for up to 2 bits. One PUCCH is for more than 2 bits. In some embodiments, one PUCCH resource is configured for up to 2 bits. One or more PUCCHs are configured for more than 2 bits. In some embodiments, the UE selects one PUCCH resource based on the payload. In some embodiments, the PUCCH resource for transmission is determined by an indicator in activation DCI. In some embodiments, the PUCCH resource for transmission is determined by a predefined rule for SPS PDSCH without DCI. In some embodiments, the predefined rule includes choosing the first PUCCH resource which satisfies the indicated coding rate requirement, where the resources are indexed according to an ascending order for the product of a number of corresponding REs, modulation order $Q_m$, and configured code rate r. If the last PUCCH resource fails to satisfy the coding rate requirement, the last PUCCH resource is chosen.

In some embodiments, mechanism described above is for one SPS configuration.

In some embodiments, when multiple SPS configurations are configured, independent PUCCH resources are configure for each SPS configuration. In some embodiments, when multiple SPS configurations are configured, the PUCCH resource is based on at least one of the following: the PUCCH resource is derived from the first or last SPS PDSCH reception associated to the HARQ-ACK codebook; the PUCCH resource is chosen from PUCCH resources configured for the SPS configuration with a minimum or maximum SPS configuration ID; and the PUCCH resource is chosen from PUCCH resources configured for the SPS configuration with a higher priority.

In some embodiments, when multiple SPS configurations are configured, one or more PUCCH resources are configured for all SPS configurations. In other words, all SPS configurations share the same PUCCH resource. In some embodiments, when multiple SPS configurations are configured, the PUCCH resource is the same as the mechanisms for one SPS configuration.

Some embodiments described herein relate to enhancement of semi-static HARQ-ACK codebook.

For semi-static HARQ codebook, HARQ-ACK bits in the codebook are based on the configured time domain resource allocation (TDRA). The new start and length indicator value (SLIV) caused by the periodicity smaller than 1 slot may not be in the TDRA table, and have not been taken into consideration. Then, the first step is to define the SPS transmission occasion.

In some embodiments, different SPS transmission occasions within a slot do not overlap with each other. In some examples, the SPS transmission occasion pattern in a slot is {4,3,4,3}, where 4 or 3 is in a unit of symbols. In some embodiments, the SPS transmission occasion pattern in a slot is {4,4,4,2}, where 4 or 3 is in a unit of symbols. In some embodiments, the SPS transmission occasion pattern in a slot is {4,4,4,-}, where 4 or 3 is in a unit of symbols, and '—' means no SPS transmission occasion. In some embodiments, the SPS transmission occasion pattern in every two slots is {4,4,4,-, 4,4,4}, where 4 is in a unit of symbols, and '—' means no SPS transmission occasion.

In some embodiments, at least two SPS transmission occasions within a slot overlap with each other. In some embodiments, the length of SPS transmission occasion is 4 symbols. There is one symbol overlap between the first and the second SPS transmission occasion in one slot. There is one symbol overlap between the third and the fourth SPS transmission occasion in one slot, an example of which is shown in FIG. 10.

Once the SPS transmission occasion is defined, the bit order for SPS in a semi-static HARQ-ACK codebook is defined. In some examples, N additional HARQ-ACK bits can be added to the semi-static HARQ-ACK codebook, where N can be calculated based on the configured SPS periodicity and the number of PUCCHs for HARQ-ACK feedback in a slot. In some scenarios, there could be some overlaps between SPS transmission occasion and the SLIVs in TDRA table. This means that there is HARQ-ACK redundancy for this method.

In some embodiments, the candidate PDSCHs are based on all SLIVs in TDRA table and all SPS transmission occasions. In some embodiments, responsive to multiple SPS configurations being configured, the candidate PDSCHs are determined based on all SLIVs in TDRA table and all SPS transmission occasions across all SPS configurations. In some embodiments, one HARQ-ACK information bit is generated for the SPS transmission occasion that does not overlapped with the SLIVs in TDRA table. In some embodiments, the HARQ-ACK information bits for the SPS transmission occasions not overlapped with the SLIVs in TDRA table is put in the beginning or in the end of the HARQ-ACK codebook. In some embodiments, one HARQ-ACK information bit is generated for two or more overlapping SPS transmission occasions.

In some embodiments, one HARQ-ACK information bit is generated for one candidate PDSCH, where the candidate PDSCH includes a group of overlapping PDSCHs which includes at least one of (1) the overlap of a PDSCH determined by SLIV and a PDSCH determined by SLIV; (2) a PDSCH determined by SLIV and a PDSCH determined by SPS transmission occasion; and (3) a PDSCH determined by SPS transmission occasion and a PDSCH determined by SPS transmission occasion. In some embodiments, one HARQ-ACK information bit is generated for the overlapping PDSCHs, where the overlapping PDSCHs includes at least one of (1) a PDSCH determined by SLIV overlapping with a PDSCH determined by SLIV; (2) a PDSCH determined by SLIV overlapping with a PDSCH determined by SPS transmission occasion; and (3) a PDSCH determined by SPS transmission occasion overlapping with a PDSCH determined by SPS transmission occasion.

In some embodiments, responsive to multiple SPS configurations being configured, N additional HARQ-ACK bits can be added to the semi-static HARQ-ACK codebook, where N can be calculated based on the minimum periodicity among the multiple SPS configurations and the number of PUCCHs for HARQ-ACK feedback in a slot. In some examples, N is equal to M_sps*K_unit, where M_sps is the number of SPS transmission occasions in a time unit, and K_unit is the number of time units associated to the semi-static HARQ-ACK codebook. The time unit is a slot or a sub-slot defined for HARQ-ACK feedback. In some embodiments, if one SPS transmission occasion is across the time unit boundary, the SPS transmission occasion is counted in the number of SPS transmission occasions in the time unit. In some embodiments, if one SPS transmission occasion is across the time unit boundary, the SPS transmission occasion is not counted in the number of SPS transmission occasions in the time unit.

Some embodiments described herein relate to the mapping between SPS HARQ-ACK and multiple HARQ-ACK codebooks. For a Rel-16 UE, at least two HARQ-ACK codebooks can be simultaneously constructed for supporting different service types for a UE. SPS HARQ-ACK can be mapped to the multiple HARQ-ACK codebooks in the manner described herein.

In some embodiments, an indicator in the activation DCI is used to indicate that the HARQ-ACK for SPS PDSCH of one or more SPS configurations belongs a corresponding HARQ-ACK codebook. In some embodiments, the indicator is an HARQ-ACK codebook indicator, all the HARQ-ACK for SPS PDSCH of one or more SPS configurations activated by the activation DCI are mapped to one HARQ-ACK codebook indicated by the HARQ-ACK codebook indicator. In some embodiments, the indicator is an priority indicator, all the HARQ-ACK for SPS PDSCH of one or more SPS configurations activated by the activation DCI are mapped to one HARQ-ACK codebook as determined by the priority indicator.

In some embodiments, a high layer parameter is used to indicate the HARQ-ACK for SPS PDSCH of one or more SPS configurations belongs to a corresponding HARQ-ACK codebook. In some embodiments, the high layer parameter indicates the HARQ-ACK codebook ID. In some embodiments, the high layer parameter indicates the service type or a priority ID.

In some embodiments, the HARQ-ACK for SPS PDSCH of one SPS configuration belonging to which HARQ-ACK codebook is determined by the periodicity of the SPS configuration. In some embodiments, when the periodicity of one SPS configuration is equal or less than a threshold, one HARQ-ACK codebook is used. In some embodiments, when the periodicity of one SPS configuration is larger than a threshold, another HARQ-ACK codebook is used. In some embodiments, the threshold for SPS periodicity is one slot or 10 ms, or a value between 2-OS and 10 ms.

Some embodiments disclosed herein relate to reducing PUCCH overhead. In the current specification, a UE needs to transmit HARQ-ACK for each SPS PDSCH reception. However, the PUCCH resource overhead and the UE power consumption increase significantly as the SPS periodicity is reduced to one slot or even smaller. Various feedback methods such as but not limited to, ACK-only feedback, NACK-only feedback, HARQ-less feedback, and so on can be implemented. For 1-bit HARQ feedback, ACK-only means the UE will only provide an ACK feedback when the UE successfully decodes the SPS PDSCH reception while not providing a NACK feedback when the UE fails to decode the SPS PDSCH reception. Correspondingly, for 1-bit HARQ feedback, NACK-only feedback means that the UE will only provide a NACK feedback while not providing an ACK feedback. For 2 or more bits HARQ feedback, ACK-only means that the UE will at least not provide feedback in case all of the bits are NACK, and NACK-only means that the UE will at least not provide feedback in case all of the bits are ACK. HARQ-less feedback means that the UE will provide no feedback for SPS PDSCH reception.

In some embodiments, responsive to determining that the SPS periodicity is equal or less than a threshold, the UE uses a first feedback mechanism, otherwise the UE uses a second feedback mechanism. The first feedback mechanism is different with the second feedback mechanism. In some embodiments, the first and the second feedback mechanisms can be any combination of different ones of the ACK-only feedback, NACK-only feedback, HARQ-less feedback, and ACK/NACK feedback. ACK/NACK feedback refers to providing a ACK feedback responsive to the SPS PDSCH reception being successfully decoded and providing NACK feedback responsive to determining failure of decoding the SPS PDSCH reception.

In some embodiments, the threshold for SPS periodicity is one slot or 10 ms, or a value between 2-OS and 10 ms.

In some embodiments, two SPS periodicity thresholds are defined. The UE uses a first feedback mechanism responsive to determining that SPS periodicity is equal or less than a first threshold. The UE uses a second feedback mechanism responsive to determining that SPS periodicity is larger than a first threshold and equal or less than a second threshold. Otherwise, the UE uses a third feedback mechanism. In some embodiments, the first, second, and the third feedback mechanism include any combination of the ACK-only feedback, NACK-only feedback, HARQ-less feedback, and ACK/NACK feedback.

When ACK-only feedback or NACK-only feedback is used, new UCI multiplexing mechanisms are needed for multiplexing with different PUCCH formats carrying different UCI. For ACK-only feedback using PUCCH format 0, a first PUCCH resource for ACK-only transmission is defined. In some embodiments, the first PUCCH resource includes at least one of a resource block (RB), one or more OFDM symbols, and an initial cyclic shift.

In some embodiments, responsive to determining that the first PUCCH resource collides with a second PUCCH resource carrying with a positive SR in PUCCH format 0, the UE transmits the multiplexing SR and ACK-only in a third PUCCH resource. In some embodiments, the third PUCCH resource has the same RB and same OFDM symbols with the first PUCCH resource. In some embodiments, the third PUCCH resource has a different initial cyclic shift with the first PUCCH resource. In some embodiments, the third PUCCH resource has the same RB and same OFDM symbols with the second PUCCH resource. In some embodiments, the third PUCCH resource has a different initial cyclic shift with the second PUCCH resource.

In some embodiments, responsive to determining that the first PUCCH resource collides with a second PUCCH resource carrying with a negative SR in PUCCH format 0, the UE transmits the ACK-only in the first PUCCH resource.

In some embodiments, responsive to determining that the first PUCCH resource collides with a second PUCCH resource carrying with an SR in PUCCH format 1, the UE drops SR and transmits ACK-only feedback in the first PUCCH resource. In some embodiments, responsive to determining that the first PUCCH resource collides with a second PUCCH resource carrying with a positive SR in PUCCH format 1, the UE transmits the multiplexing SR and ACK-only in a third PUCCH resource. In some embodiments, the third PUCCH resource has the same RB and same OFDM symbols with the first PUCCH resource. In some embodiments, the third PUCCH resource has a different initial cyclic shift with the first PUCCH resource. In some embodiments, the third PUCCH resource has the same RB and same OFDM symbols with the second PUCCH resource. In some embodiments, the third PUCCH resource has a different initial cyclic shift with the second PUCCH resource. In some embodiments, when the first PUCCH resource collides with a second PUCCH resource carrying with a negative SR in PUCCH format 1, the UE transmits ACK-only feedback in the first PUCCH resource.

In some embodiments, responsive to determining that the first PUCCH resource collides with a second PUCCH resource carrying with a first UCI with more than 2 bits in PUCCH format 2/3/4, the UE transmits the multiplexing UCI in the second PUCCH resource. In some embodiments, the multiplexing UCI is generated by a joint coding of the 1-bit ACK-only and the first UCI in PUCCH format 2/3/4. In some embodiments, the first UCI includes at least one of HARQ-ACK and CSI part 1. In some embodiments, the first UCI includes SR and at least one of HARQ-ACK and CSI part 1.

For ACK-only feedback using PUCCH format 1, define a first PUCCH resource for ACK-only transmission. In some embodiments, the first PUCCH resource includes at least one of a RB, one or more OFDM symbols, and an initial cyclic shift.

In some embodiments, responsive to determining that the first PUCCH resource collides with a second PUCCH resource carrying with a positive SR in PUCCH format 0, the UE transmits the multiplexing SR and ACK-only in a third PUCCH resource. In some embodiments, the third PUCCH resource has the same RB and same OFDM symbols with the first PUCCH resource. In some embodiments, the third PUCCH resource has a different initial cyclic shift with the first PUCCH resource. In some embodiments, the third PUCCH resource has the same RB and same OFDM symbols with the second PUCCH resource. In some embodiments, the third PUCCH resource has a different initial cyclic shift with the second PUCCH resource.

In some embodiments, responsive to determining that the first PUCCH resource collides with a second PUCCH resource carrying with a negative SR in PUCCH format 0, the UE transmits the ACK-only in the first PUCCH resource.

In some embodiments, responsive to determining that the first PUCCH resource collides with a second PUCCH resource carrying with an SR in PUCCH format 1, the UE drops SR, and transmits ACK-only feedback in the first PUCCH resource. In some embodiments, responsive to determining that the first PUCCH resource collides with a second PUCCH resource carrying with a positive SR in PUCCH format 1, the UE transmits the multiplexing SR and ACK-only in a third PUCCH resource. In some embodiments, the third PUCCH resource has the same RB and same OFDM symbols with the first PUCCH resource. In some embodiments, the third PUCCH resource has a different initial cyclic shift with the first PUCCH resource. In some embodiments, the third PUCCH resource has the same RB and same OFDM symbols with the second PUCCH resource. In some embodiments, the third PUCCH resource has a different initial cyclic shift with the second PUCCH resource. In some embodiments, responsive to determining that the first PUCCH resource collides with a second PUCCH resource carrying with a negative SR in PUCCH format 1, the UE transmits ACK-only feedback in the first PUCCH resource.

In some embodiments, responsive to determining that the first PUCCH resource collides with a second PUCCH resource carrying with a positive SR in PUCCH format 1, the UE transmits in the first PUCCH resource with $b(0)=-1$. In some embodiments, responsive to determining that the first PUCCH resource collides with a second PUCCH resource carrying with a positive SR in PUCCH format 1, the UE transmits in the second PUCCH resource with $b(0)=-1$. In some embodiments, responsive to determining that the first PUCCH resource collides with a second PUCCH resource carrying with a negative SR in PUCCH format 1, the UE transmits in the first PUCCH resource with $b(0)=1$. In some embodiments, responsive to determining that the first PUCCH resource collides with a second PUCCH resource carrying with a negative SR in PUCCH format 1, the UE transmits in the second PUCCH resource with $b(0)=1$. In some embodiments, $b(0)$ is the modulated symbol which shall be multiplied with a sequence.

In some embodiments, responsive to determining that the first PUCCH resource collides with a second PUCCH resource carrying with a first UCI with more than 2 bits in PUCCH format 2/3/4, the UE transmits the multiplexing UCI in the second PUCCH resource. In some embodiments, the multiplexing UCI is generated by a joint coding of the 1-bit ACK-only and the first UCI in PUCCH format 2/3/4. In some embodiments, the first UCI includes at least one of HARQ-ACK and CSI part 1. In some embodiments, the first UCI includes SR and at least one of HARQ-ACK and CSI part 1.

For NACK-only feedback using PUCCH format 0, a first PUCCH resource for NACK-only transmission is defined. In some embodiments, the first PUCCH resource includes at least one of a RB, one or more OFDM symbols and an initial cyclic shift.

In some embodiments, responsive to determining that the first PUCCH resource collides with a second PUCCH resource carrying with a positive SR in PUCCH format 0, the UE transmits the multiplexing SR and NACK-only in a third PUCCH resource. In some embodiments, the third PUCCH resource has the same RB and same OFDM symbols with the first PUCCH resource. In some embodiments, the third PUCCH resource has a different initial cyclic shift with the first PUCCH resource. In some embodiments, the third PUCCH resource has the same RB and same OFDM symbols with the second PUCCH resource. In some embodiments, the third PUCCH resource has a different initial cyclic shift with the second PUCCH resource.

In some embodiments, responsive to determining that the first PUCCH resource collides with a second PUCCH resource carrying with a negative SR in PUCCH format 0, the UE transmits the NACK-only in the first PUCCH resource.

In some embodiments, responsive to determining that the first PUCCH resource collides with a second PUCCH resource carrying with an SR in PUCCH format 1, the UE drops SR, and transmits NACK-only feedback in the first PUCCH resource. In some embodiments, when the first PUCCH resource collides with a second PUCCH resource carrying with a positive SR in PUCCH format 1, the UE transmits the multiplexing SR and NACK-only in a third PUCCH resource. In some embodiments, the third PUCCH resource has the same RB and same OFDM symbols with the first PUCCH resource. In some embodiments, the third PUCCH resource has a different initial cyclic shift with the first PUCCH resource. In some embodiments, the third PUCCH resource has the same RB and same OFDM symbols with the second PUCCH resource. In some embodiments, the third PUCCH resource has a different initial cyclic shift with the second PUCCH resource. In some embodiments, when the first PUCCH resource collides with a second PUCCH resource carrying with a negative SR in PUCCH format 1, the UE transmits NACK-only feedback in the first PUCCH resource.

In some embodiments, responsive to determining that the first PUCCH resource collides with a second PUCCH resource carrying with a first UCI with more than 2 bits in PUCCH format 2/3/4, the UE transmits the multiplexing UCI in the second PUCCH resource. In some embodiments, the multiplexing UCI is generated by a joint coding of the 1-bit NACK-only and the first UCI in PUCCH format 2/3/4. In some embodiments, the first UCI includes at least one of HARQ-ACK and CSI part 1. In some embodiments, the first UCI includes SR and at least one of HARQ-ACK and CSI part 1.

For NACK-only feedback using PUCCH format 1, a first PUCCH resource for NACK-only transmission is defined. In some embodiments, the first PUCCH resource includes at least one of a RB, one or more OFDM symbols and an initial cyclic shift.

In some embodiments, responsive to determining that the first PUCCH resource collides with a second PUCCH resource carrying with a positive SR in PUCCH format 0, the UE transmits the multiplexing SR and NACK-only in a third PUCCH resource. In some embodiments, the third PUCCH resource has the same RB and same OFDM symbols with the first PUCCH resource. In some embodiments, the third PUCCH resource has a different initial cyclic shift with the first PUCCH resource. In some embodiments, the third PUCCH resource has the same RB and same OFDM symbols with the second PUCCH resource. In some embodiments, the third PUCCH resource has a different initial cyclic shift with the second PUCCH resource.

In some embodiments, responsive to determining that the first PUCCH resource collides with a second PUCCH resource carrying with a negative SR in PUCCH format 0, the UE transmits the NACK-only in the first PUCCH resource.

In some embodiments, responsive to determining that the first PUCCH resource collides with a second PUCCH resource carrying with an SR in PUCCH format 1, the UE drops SR, and transmits NACK-only feedback in the first PUCCH resource. In some embodiments, when the first PUCCH resource collides with a second PUCCH resource carrying with a positive SR in PUCCH format 1, the UE transmits the multiplexing SR and NACK-only in a third PUCCH resource. In some embodiments, the third PUCCH resource has the same RB and same OFDM symbols with the first PUCCH resource. In some embodiments, the third PUCCH resource has a different initial cyclic shift with the first PUCCH resource. In some embodiments, the third PUCCH resource has the same RB and same OFDM symbols with the second PUCCH resource. In some embodiments, the third PUCCH resource has a different initial cyclic shift with the second PUCCH resource. In some embodiments, when the first PUCCH resource collides with a second PUCCH resource carrying with a negative SR in PUCCH format 1, the UE transmits NACK-only feedback in the first PUCCH resource.

In some embodiments, when the first PUCCH resource collides with a second PUCCH resource carrying with a positive SR in PUCCH format 1, the UE transmits in the first PUCCH resource with b(0)=−1. In some embodiments, responsive to determining that the first PUCCH resource collides with a second PUCCH resource carrying with a positive SR in PUCCH format 1, the UE transmits in the second PUCCH resource with b(0)=−1. In some embodiments, responsive to determining that the first PUCCH resource collides with a second PUCCH resource carrying with a negative SR in PUCCH format 1, the UE transmits in the first PUCCH resource with b(0)=1. In some embodiments, responsive to determining that the first PUCCH resource collides with a second PUCCH resource carrying with a negative SR in PUCCH format 1, the UE transmits in the second PUCCH resource with b(0)=1. In some embodiments, b(0) is the modulated symbol which shall be multiplied with a sequence.

In some embodiments, responsive to determining that the first PUCCH resource collides with a second PUCCH resource carrying with a first UCI with more than 2 bits in PUCCH format 2/3/4, the UE transmits the multiplexing UCI in the second PUCCH resource. In some embodiments, the multiplexing UCI is generated by a joint coding of the 1-bit NACK-only and the first UCI in PUCCH format 2/3/4. In some embodiments, the first UCI includes at least one of HARQ-ACK and CSI part 1. In some embodiments, the first UCI includes SR and at least one of HARQ-ACK and CSI part 1.

Some embodiments described herein relate to deriving the HARQ process ID. In current specification, for configured UL grants, the HARQ Process ID associated with the first symbol of a UL transmission can be derived using the following expression:

HARQ Process ID=[floor(CURRENT_symbol/periodicity)]modulo nrofHARQ-Processes;

where CURRENT_symbol=(SFN×numberOfSlotsPerFrame×numberOfSymbolsPerSlot+slot number in the frame×numberOfSymbolsPerSlot+symbol number in the slot). In addition, numberOfSlotsPerFrame and numberOfSymbolsPerSlot refers to a number of consecutive slots per frame and a number of consecutive symbols per slot. In some examples, periodicity is the SPS periodicity, and nrofHARQ-Processes is the total number of HARQ processes.

When the SPS periodicity is reduced to be smaller than 1 slot, the current SPS HARQ process ID determination equation based on slot level can no longer be used. Although the HARQ process ID determination equation for UL configured grant as given herein is defined by a symbol level, the determination equation cannot directly reused when some of the SPS transmission occasion overlaps with each other within a slot.

In some embodiments, the overlapping SPS transmission occasions are firstly pruned to non-overlapped SPS transmission occasions. In some embodiments, the HARQ-ID is determined by one of the symbol index of the pruned non-overlapped SPS transmission occasion. In some embodiments, the HARQ-ID is determined by the first symbol of the pruned non-overlapped SPS transmission occasion. In some embodiments, the HARQ-ID is determined by the first symbol index of the pruned non-overlapped SPS transmission occasion.

FIG. 11A illustrates a block diagram of an example base station 1102, in accordance with some embodiments of the present disclosure. FIG. 11B illustrates a block diagram of an example UE 1101, in accordance with some embodiments of the present disclosure. Referring to FIGS. 1-11B, the UE 1101 (or wireless communication device) is an example implementation of the UEs described herein, and the base station 1102 is an example implementation of the base station described herein.

The base station 1102 and the UE 1101 can include components and elements configured to support known or conventional operating features that need not be described in detail herein. In one illustrative embodiment, the base station 1102 and the UE 1101 can be used to communicate (e.g., transmit and receive) data symbols in a wireless communication environment such as the network system architecture 100 and the slice deployment 200, as described above. For instance, the base station 1102 can be a base station (e.g., gNodeBs (gNBs), and so on), a server, a node, or any suitable computing device used to implement the NFs (e.g., the AMF 102, the SMF 106, the UPF 108, the UDM 112, the PCF 114, the AF 116, and so on) and to provide the networks 104, 110, and 202.

The base station 1102 includes a transceiver module 1110, an antenna 1112, a processor module 1114, a memory module 1116, and a network communication module 1118. The module 1110, 1112, 1114, 1116, and 1118 are operatively coupled to and interconnected with one another via a data communication bus 1120. The UE 1101 includes a UE transceiver module 1130, a UE antenna 1132, a UE memory module 1134, and a UE processor module 1136. The modules 1130, 1132, 1134, and 1136 are operatively coupled to and interconnected with one another via a data communication bus 1140. The base station 1102 communicates with the UE 1101 or another base station via a communication channel, which can be any wireless channel or other medium suitable for transmission of data as described herein.

As would be understood by persons of ordinary skill in the art, the base station 1102 and the UE 1101 can further include any number of modules other than the modules shown in FIGS. 11A and 11B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 1130 includes a radio frequency (RF) transmitter and a RF receiver each including circuitry that is coupled to the antenna 1132. A duplex switch (not shown) may alternatively couple the RF transmitter or receiver to the antenna in time duplex fashion. Similarly, in accordance with some embodiments, the transceiver 1110 includes an RF transmitter and a RF receiver each having circuitry that is coupled to the antenna 1112 or the antenna of another base station. A duplex switch may alternatively couple the RF transmitter or receiver to the antenna 1112 in time duplex fashion. The operations of the two transceiver modules 1110 and 1130 can be coordinated in time such that the receiver circuitry is coupled to the antenna 1132 for reception of transmissions over a wireless transmission link at the same time that the transmitter is coupled to the antenna 1112. In some embodiments, there is close time synchronization with a minimal guard time between changes in duplex direction.

The UE transceiver 1130 and the transceiver 1110 are configured to communicate via the wireless data communication link, and cooperate with a suitably configured RF antenna arrangement 1112/1132 that can support a particular wireless communication protocol and modulation scheme. In some illustrative embodiments, the UE transceiver 1110 and the transceiver 1110 are configured to support industry standards such as the Long Term Evolution (LTE) and emerging 5G standards, and the like. It is understood, however, that the present disclosure is not necessarily limited in application to a particular standard and associated protocols. Rather, the UE transceiver 1130 and the base station transceiver 1110 may be configured to support alternate, or additional, wireless data communication protocols, including future standards or variations thereof.

The transceiver 1110 and the transceiver of another base station (such as but not limited to, the transceiver 1110) are configured to communicate via a wireless data communication link, and cooperate with a suitably configured RF antenna arrangement that can support a particular wireless communication protocol and modulation scheme. In some illustrative embodiments, the transceiver 1110 and the transceiver of another base station are configured to support industry standards such as the LTE and emerging 5G standards, and the like. It is understood, however, that the present disclosure is not necessarily limited in application to a particular standard and associated protocols. Rather, the transceiver 1110 and the transceiver of another base station may be configured to support alternate, or additional, wireless data communication protocols, including future standards or variations thereof.

In accordance with various embodiments, the base station 1102 may be a base station such as but not limited to, an eNB, a serving eNB, a target eNB, a femto station, or a pico station, for example. The base station 1102 can be an RN, a regular, a DeNB, a gNB, or an IAB donor. In some embodiments, the UE 1101 may be embodied in various types of user devices such as a mobile phone, a smart phone, a personal digital assistant (PDA), tablet, laptop computer, wearable computing device, etc. The processor modules 1114 and 1136 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 1114 and 1136, respectively, or in any practical combination thereof. The memory modules 1116 and 1134 may be realized as RAM memory, flash memory, ROM memory, EPROM memory, EEPROM memory, registers, a hard disk, a removable disk, a CD-ROM, or any other form of storage medium known in the art. In this regard, memory modules 1116 and 1134 may be coupled to the processor modules 1110 and 1130, respectively, such that the processors modules 1110 and 1130 can read information from, and write information to, memory modules 1116 and 1134, respectively. The memory modules 1116 and 1134 may also be integrated into their respective processor modules 1110 and 1130. In some embodiments, the memory modules 1116 and 1134 may each include a cache memory for storing temporary variables or other intermediate information during execution of instructions to be executed by processor modules 1110 and 1130, respectively. Memory modules 1116 and 1134 may also each include non-volatile memory for storing instructions to be executed by the processor modules 1110 and 1130, respectively.

The network communication module 1118 generally represents the hardware, software, firmware, processing logic, and/or other components of the base station 1102 that enable bi-directional communication between the transceiver 1110 and other network components and communication nodes in communication with the base station 1102. For example, the network communication module 1118 may be configured to support internet or WiMAX traffic. In a deployment, without limitation, the network communication module 1118 provides an 802.3 Ethernet interface such that the transceiver 1110 can communicate with a conventional Ethernet based computer network. In this manner, the network communication module 1118 may include a physical interface for connection to the computer network (e.g., Mobile Switching Center (MSC)). In some embodiments in which the base station 1102 is an IAB donor, the network communication module 1118 includes a fiber transport connection configured to connect the base station 1102 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A wireless communication method, comprising:
   determining, by a wireless communication device, that a first transmission on a first resource is canceled due to a portion of the first resource overlapping with an overlapped resource used for a separate transmission; and
   in response to determining that the first transmission on the first resource is canceled, performing, by the wireless communication device, a second transmission of a physical uplink shared channel (PUSCH) on a second resource, wherein configuration parameters of the second transmission of PUSCH on the second resource are configured by a network side or obtained from the first transmission,
   wherein a time domain resource of the second resource is a time domain resource of the first resource after a reference orthogonal frequency division multiplexing (OFDM) symbol in time,
   wherein the reference OFDM symbol is an $N^{th}$ OFDM symbol after a last symbol of physical downlink control channel (PDCCH) that schedules a separate transmission on the overlapped resource or after a starting time of the overlapped resource,
   wherein a value of N is configured by the network side or predefined, and
   wherein, responsive to frequency hopping being disabled, a frequency domain resource of the second resource corresponds to a frequency domain resource of the first resource.

2. The wireless communication method of claim 1, wherein
   the frequency hopping is enabled for the first transmission;
   the first resource comprises a first hop and a second hop;
   a portion of a time domain resource of the first hop that is after the overlapped resource or after the reference OFDM symbol has a number of symbols that is less than or equal to a threshold, the first transmission of the first resource being canceled due to a portion of the first resource overlapping with an overlapped resource used for a separate transmission; and
   a time domain resource of the second resource corresponds to the time domain resource of the second hop.

3. The wireless communication method of claim 1, wherein performing the second transmission of the PUSCH on the second resource comprises:
   determining that a time domain resource of the second resource has a number of symbols that is less than or equal to a threshold; and
   refraining from performing the second transmission in response to determining that the time domain resource of the second resource is less than or equal to the number of symbols.

4. The wireless communication method of claim 1, wherein
   the frequency hopping is enabled for the first transmission;
   the first resource comprises a first hop and a second hop;
   in response to determining that a portion of a time domain resource of the first hop that is after the overlapped resource or after the reference OFDM symbol has a number of symbols that is greater than a threshold, frequency hopping is enabled for the second transmission.

5. The wireless communication method of claim 1, wherein
   the frequency hopping is disabled for the second transmission in response to determining that frequency hopping is disabled for the first transmission; or
   frequency hopping is enabled for the first transmission, the first resource comprising a first hop and a second hop, in response to determining that a portion of a time domain resource of the first hop that is after the overlapped resource or after the reference OFDM symbol has a number of symbols that is less than or equal to a threshold, frequency hopping is disabled for the second transmission.

6. The wireless communication method of claim 1, wherein
   the first transmission corresponds to a first hybrid automatic repeat request (HARQ) process number;
   the second transmission corresponds to a second HARQ process number; and
   the second HARQ process number is a next unoccupied HARQ process number that is before or after the first HARQ number.

7. The wireless communication method of claim 1, wherein performing the second transmission of the PUSCH on the second resource comprises:
   determining that all hybrid automatic repeat request (HARQ) process numbers have been occupied; and
   refraining from performing the second transmission in response to determining that all HARQ process numbers have been occupied.

8. The wireless communication method of claim 1, wherein
   a new data indication (NDI) of the PUSCH is set to be 0 or 1; and
   the second transmission of the PUSCH is a new transmission instead of retransmission of the first transmission.

9. The wireless communication method of claim 1, wherein a new medium access control (MAC) protocol data unit (PDU) is generated for the PUSCH to be transmitted on the second resource.

10. The wireless communication method of claim 1, wherein
    the first transmission corresponds to a first hybrid automatic repeat request (HARQ) process number;
    the second transmission corresponds to a second HARQ process number; and
    the first HARQ process number and the second HARQ process number are the same.

11. The wireless communication method of claim 1, wherein
    a medium access control (MAC) multiplexes and assembles a service data unit (SDU) originally to be carried by an original PUSCH of the first transmission into a MAC protocol data unit (PDU); and
    the MAC PDU is transmitted via the second transmission.

12. The wireless communication method of claim 1, wherein the configuration parameters comprise one or more of a modulation and coding scheme (MCS), a redundancy version, transmission power, a sounding reference signal (SRS) resource indication, precoding information, a number of layers, antenna port configurations, or demodulation reference signal (DMRS) sequence initialization information.

13. The wireless communication method of claim 1, wherein each of the configuration parameters is the same as a corresponding one of original configuration parameters of the first transmission.

14. The wireless communication method of claim 1, wherein each of the configuration parameters are configured by the network side via radio resource control (RRC) signaling.

15. A wireless communication device, comprising:
at least one processor configured to:
  determine that a first transmission on a first resource is canceled due to a portion of the first resource overlapping with an overlapped resource used for a separate transmission; and
  in response to determining that the first transmission on the first resource is canceled, performing, via a transceiver, a second transmission of a physical uplink shared channel (PUSCH) on a second resource, wherein configuration parameters of the second transmission of PUSCH on the second resource are configured by a network side or obtained from the first transmission,
wherein a time domain resource of the second resource is a time domain resource of the first resource after a reference orthogonal frequency division multiplexing (OFDM) symbol in time,
wherein the OFDM symbol is an $N^{th}$ OFDM symbol after a last symbol of physical downlink control channel (PDCCH) that schedules a separate transmission on the overlapped resource or after a starting time of the overlapped resource,
wherein a value of N is configured by the network side or predefined, and
wherein, responsive to frequency hopping being disabled, a frequency domain resource of the second resource corresponds to a frequency domain resource of the first resource.

16. A wireless communication method, comprising:
determining, by a network side, that a first transmission of a wireless communication device on a first resource is canceled due to a portion of the first resource overlapping with an overlapped resource used for a separate transmission; and
in response to determining that the first transmission of the wireless communication device on the first resource is canceled, configuring and receiving a second transmission of the wireless communication device for a physical uplink shared channel (PUSCH) on a second resource,
wherein configuration parameters of the second transmission of the PUSCH on the second resource are configured by the network side or obtained from the first transmission,
wherein a time domain resource of the second resource is a time domain resource of the first resource after a reference orthogonal frequency division multiplexing (OFDM) symbol in time,
wherein the reference OFDM symbol is an $N^{th}$ OFDM symbol after a last symbol of physical downlink control channel (PDCCH) that schedules a separate transmission on the overlapped resource or after a starting time of the overlapped resource,
wherein a value of N is configured by the network side or predefined, and
wherein, responsive to frequency hopping being disabled, a frequency domain resource of the second resource corresponds to a frequency domain resource of the first resource.

* * * * *